US012263525B2

(12) United States Patent
Nishioka et al.

(10) Patent No.: US 12,263,525 B2
(45) Date of Patent: Apr. 1, 2025

(54) JOINED SOLID PRODUCTION METHOD

(71) Applicant: K.K. SUN METALON, Kawasaki (JP)

(72) Inventors: Kazuhiko Nishioka, Kawasaki (JP); Koji Kageyama, Kawasaki (JP)

(73) Assignee: K.K. Sun Metalon, Kawasaki (JP)

( * ) Notice: Subject to any disclaimer, the term of this patent is extended or adjusted under 35 U.S.C. 154(b) by 0 days.

(21) Appl. No.: 18/404,793

(22) Filed: Jan. 4, 2024

(65) Prior Publication Data

US 2024/0165707 A1 May 23, 2024

Related U.S. Application Data

(63) Continuation of application No. 18/550,668, filed as application No. PCT/JP2021/045831 on Dec. 13, 2021.

(30) Foreign Application Priority Data

Mar. 15, 2021 (JP) ................. 2021-041553

(51) Int. Cl.
*B22F 10/22* (2021.01)
*B22F 1/12* (2022.01)
(Continued)

(52) U.S. Cl.
CPC ............... *B22F 10/22* (2021.01); *B22F 1/12* (2022.01); *B22F 3/004* (2013.01); *B22F 3/14* (2013.01);
(Continued)

(58) Field of Classification Search
None
See application file for complete search history.

(56) References Cited

U.S. PATENT DOCUMENTS 4,880,578 A * 11/1989 Holcombe ............... H05B 6/80
264/432
5,702,501 A 12/1997 Osawa et al.
(Continued)

FOREIGN PATENT DOCUMENTS

CN 101323529 A 12/2008
CN 103882423 A 6/2014
(Continued)

OTHER PUBLICATIONS

Bansal, Amit et al., "Characterization of bulk stainless steel joints developed through microwave hybrid heating," Materials Characterization, May 2014. vol. 91, pp. 34-41.
(Continued)

*Primary Examiner* — Devang R Patel
(74) *Attorney, Agent, or Firm* — Knobbe, Martens, Olson & Bear, LLP

(57) ABSTRACT

A method for producing a joined solid, the method comprising placing a metal powder on a solid; covering at least a portion of the periphery of the metal powder with a high-melting-point material having a melting point higher than the melting point of the metal powder; and irradiating the metal powder, at least a portion of the periphery of which is covered with the high-melting-point material, with microwaves to heat the metal powder, thereby sintering or melt-solidifying the metal powder to form a metal solid on the solid.

14 Claims, 19 Drawing Sheets

(51) Int. Cl.
| | |
|---|---|
| *B22F 3/00* | (2021.01) |
| *B22F 3/14* | (2006.01) |
| *B22F 3/16* | (2006.01) |
| *B22F 3/24* | (2006.01) |
| *B22F 5/00* | (2006.01) |
| *B22F 7/02* | (2006.01) |
| *B22F 7/04* | (2006.01) |
| *B22F 7/08* | (2006.01) |
| *B22F 9/20* | (2006.01) |
| *B22F 10/10* | (2021.01) |
| *B22F 10/20* | (2021.01) |
| *B22F 10/25* | (2021.01) |
| *B22F 10/66* | (2021.01) |
| *B22F 12/41* | (2021.01) |
| *B22F 12/50* | (2021.01) |
| *B22F 12/60* | (2021.01) |
| *B22F 12/70* | (2021.01) |
| *B23K 1/005* | (2006.01) |
| *B33Y 10/00* | (2015.01) |
| *B33Y 30/00* | (2015.01) |
| *B33Y 70/10* | (2020.01) |
| *B22F 3/105* | (2006.01) |

(52) U.S. Cl.
CPC .................. *B22F 3/16* (2013.01); *B22F 3/24* (2013.01); *B22F 5/00* (2013.01); *B22F 7/02* (2013.01); *B22F 7/04* (2013.01); *B22F 7/08* (2013.01); *B22F 9/20* (2013.01); *B22F 10/10* (2021.01); *B22F 10/20* (2021.01); *B22F 10/25* (2021.01); *B22F 10/66* (2021.01); *B22F 12/41* (2021.01); *B22F 12/50* (2021.01); *B22F 12/60* (2021.01); *B22F 12/70* (2021.01); *B23K 1/005* (2013.01); *B33Y 10/00* (2014.12); *B33Y 30/00* (2014.12); *B33Y 70/10* (2020.01); *B22F 2003/1054* (2013.01); *B22F 2007/042* (2013.01); *B22F 2007/045* (2013.01); *B22F 2201/01* (2013.01); *B22F 2201/10* (2013.01); *B22F 2201/50* (2013.01); *B22F 2202/11* (2013.01); *B22F 2301/052* (2013.01); *B22F 2301/35* (2013.01); *B22F 2998/10* (2013.01); *B22F 2999/00* (2013.01); *C04B 2237/34* (2013.01); *C04B 2237/363* (2013.01)

(56) References Cited

U.S. PATENT DOCUMENTS

| | | | |
|---|---|---|---|
| 5,736,092 | A * | 4/1998 | Apte ...................... C04B 35/64 |
| | | | 264/432 |
| 6,544,315 | B2 | 4/2003 | Har-Shai |
| 10,682,699 | B2 * | 6/2020 | Martin .................. B33Y 10/00 |
| 10,960,497 | B2 * | 3/2021 | Yahata ............... B23K 35/0227 |
| 2009/0039572 | A1 | 2/2009 | Nagata et al. |
| 2009/0191358 | A1 * | 7/2009 | Perelaer ................ H01L 21/288 |
| | | | 427/557 |
| 2010/0193574 | A1 * | 8/2010 | Cretegny ............... B23K 1/005 |
| | | | 228/234.1 |
| 2014/0087210 | A1 | 3/2014 | Keane et al. |
| 2015/0054204 | A1 | 2/2015 | Tseliakhovich et al. |
| 2016/0158828 | A1 | 6/2016 | Tanaka |
| 2017/0165791 | A1 | 6/2017 | Kamachi et al. |
| 2018/0162048 | A1 | 6/2018 | Gibson et al. |
| 2018/0178447 | A1 | 6/2018 | Abbott, Jr. et al. |
| 2018/0221950 | A1 | 8/2018 | Mark |
| 2018/0265417 | A1 | 9/2018 | Champion et al. |
| 2019/0134713 | A1 | 5/2019 | Abbott, Jr. et al. |
| 2020/0047252 | A1 * | 2/2020 | Kritchman .............. C04B 35/56 |
| 2023/0271248 | A1 * | 8/2023 | Myrick ................... B22F 1/054 |

FOREIGN PATENT DOCUMENTS

| | | |
|---|---|---|
| CN | 107262714 A | 10/2017 |
| JP | 2009-035776 A | 2/2009 |
| JP | 2012-158790 A | 8/2012 |
| JP | 2013-216943 A | 10/2013 |
| JP | 2017-110294 A | 6/2017 |
| JP | 2017-145151 A | 8/2017 |
| JP | 2018-144086 A | 9/2018 |
| JP | 2020-517824 A | 6/2020 |
| JP | 2020-151993 A | 9/2020 |

OTHER PUBLICATIONS

International Search Report and Written Opinion received in PCT Application No. PCT/JP2021/045831, dated Jan. 25, 2022 in 16 pages.
International Search Report and Written Opinion received in PCT Application No. PCT/JP2022/011575, dated May 24, 2022 in 16 pages.
Tamang Siddharth et al: "Brazing of cBN to WC—Co by Ag—Cu—In—Ti alloy through microwave hybrid heating for cutting tool application", Materials Letters, Elsevier, Amsterdam, NL, vol. 254, Jul. 13, 2019 (Jul. 13, 2019), pp. 145-148, XP085810263, ISSN: 0167-577X, DOI:10.1016/J.MATLET.2019.07.041.

\* cited by examiner

Fig. 6
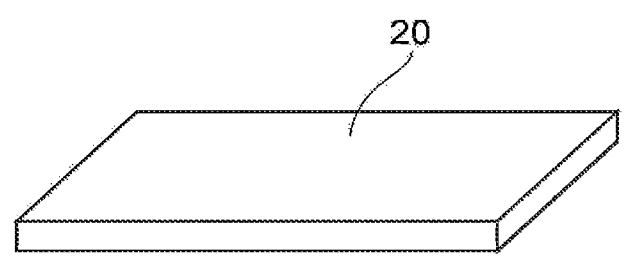
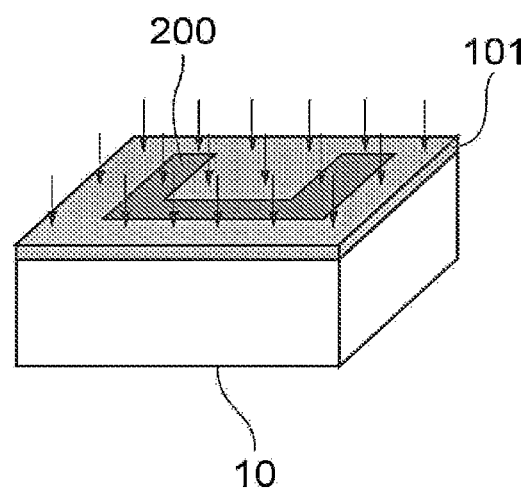

Fig. 11
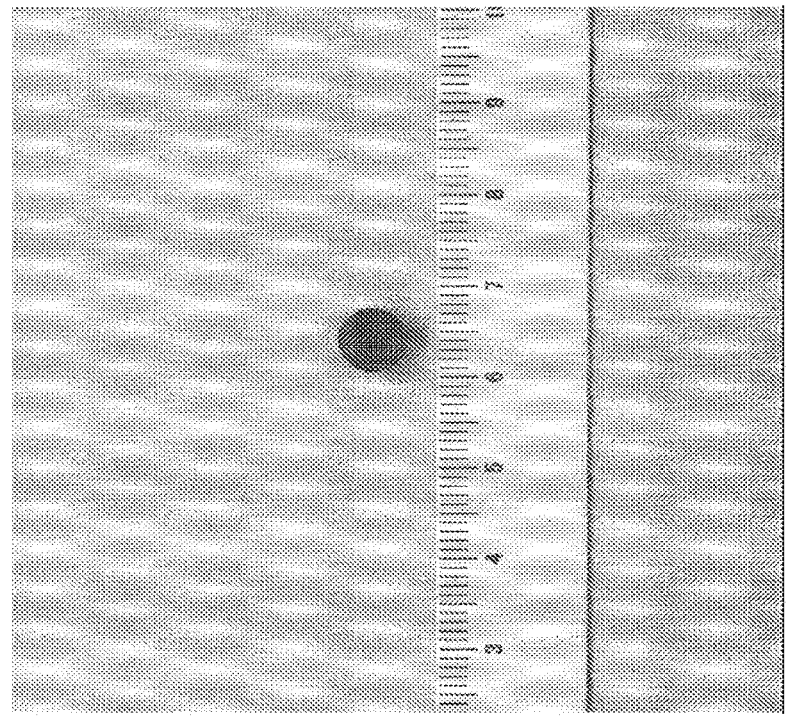
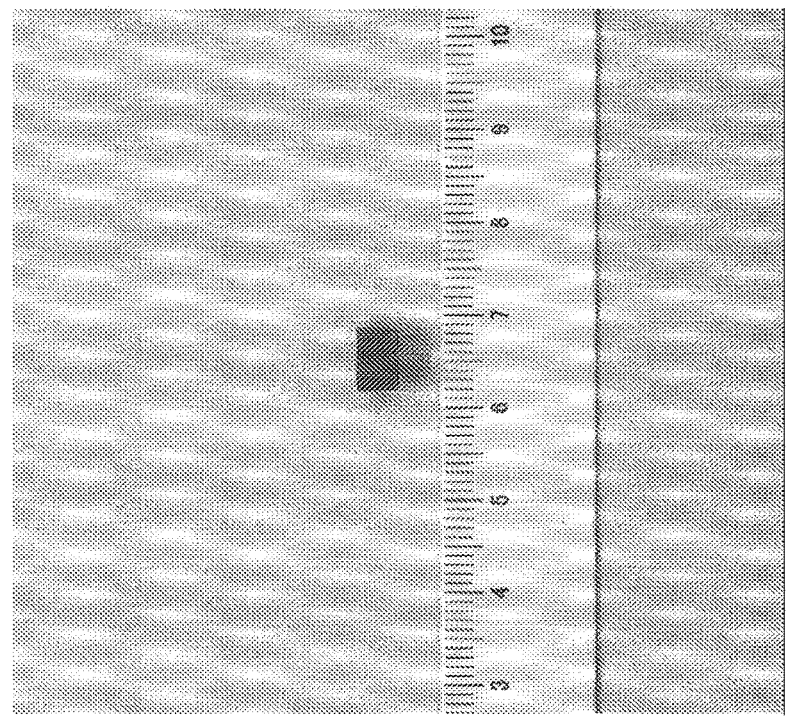

JOINED SOLID PRODUCTION METHOD

TECHNICAL FIELD

The present disclosure relates to a method for producing a joined solid.

BACKGROUND ART

Conventionally, metal solid parts used in daily necessities, home electric appliances, machine tools, and the like are produced by processing ingots, metal steel pieces, etc. Processes of processing ingots and metal steel pieces are complicated, including various steps. Processes of processing ingots and metal steel pieces may involve various processing companies. Accordingly, processes of processing ingots and metal steel pieces may involve logistical transport therein. Therefore, processes of processing ingots and metal steel pieces are expensive. If one step is disrupted in process of processing ingots and metal steel pieces, all downstream steps may be disrupted.

CITATION LIST

Patent Literature

Patent Literature 1: Japanese Patent Laid-Open No. 2012-158790
Patent Literature 2: Japanese Patent Laid-Open No. 2017-145151
Patent Literature 3: Japanese Patent Laid-Open No. 2009-035776
Patent Literature 4: Japanese Patent Laid-Open No. 2013-216943
Patent Literature 5: Japanese Patent Laid-Open No. 2017-145151

SUMMARY

Technical Problem

An object of the present disclosure is to provide a method for producing a metal solid, the method being capable of easily producing a metal solid. Another object of the present disclosure is to provide a method for producing a joined solid, the method being capable of easily bonding a metal solid to a solid, and a method for producing a joined solid, the method being capable of easily bonding solids together.

Solution to Problem

An aspect of the present disclosure provides a method for producing a metal solid, the method including covering at least a portion of the periphery of a metal powder with a high-melting-point material having a melting point higher than the melting point of the metal powder; and irradiating the metal powder, at least a portion of the periphery of which is covered with the high-melting-point material, with microwaves to heat the metal powder, thereby sintering or melt-solidifying the metal powder.

In the above method for producing a metal solid, the covering at least a portion of the periphery of the metal powder with the high-melting-point material, and the sintering or melt-solidifying the metal powder may be repeated.

In the above method for producing a metal solid, laminated metal solids may be formed.

In the above method for producing a metal solid, the high-melting-point material may include an insulation material that has a lower degree of absorption of the microwaves than the metal powder.

In the above method for producing a metal solid, the high-melting-point material may include an absorbent material that absorbs the microwaves in a temperature zone at least a portion of which is lower than a temperature zone in which the metal powder absorbs the microwaves.

In the above method for producing a metal solid, the high-melting-point material may include an insulation material that has a lower degree of absorption of the microwaves than the metal powder; and an absorbent material that absorbs the microwaves in a temperature zone at least a portion of which is lower than a temperature zone in which the metal powder absorbs the microwaves.

In the above method for producing a metal solid, the high-melting-point material may include from 1 mass % to 70 mass % of the absorbent material.

In the above method for producing a metal solid, the insulation material may include an oxide.

In the above method for producing a metal solid, the insulation material may include at least one selected from the group consisting of aluminum oxide, silicon oxide, magnesium oxide, zirconium oxide, and titanium oxide.

In the above method for producing a metal solid, the absorbent material may include a carbon material.

In the above method for producing a metal solid, the absorbent material may include at least one selected from the group consisting of carbon, graphite, silicon carbide, carbon resin, and metal carbide.

In the above method for producing a metal solid, the metal powder may include a metal.

In the above method for producing a metal solid, the metal powder may include at least one selected from the group consisting of iron, nickel, copper, gold, silver, aluminum, and cobalt.

In the above method for producing a metal solid, the metal powder may include a metal compound.

In the above method for producing a metal solid, the metal powder may include a compound of at least one selected from the group consisting of iron, nickel, copper, gold, silver, aluminum, and cobalt.

In the above method for producing a metal solid, the metal powder may further include an alloy component.

In the above method for producing a metal solid, the alloy component may include at least one selected from the group consisting of silicon, manganese, chromium, nickel, carbon, boron, copper, aluminum, titanium, niobium, vanadium, zinc, and sulfur.

In the above method for producing a metal solid, the metal powder may have an average particle size of 200 μm or less.

In the above method for producing a metal solid, the metal powder may include a metal oxide, and the metal powder may be reduced in the irradiation of the metal powder with microwaves.

In the above method for producing a metal solid, the metal powder may include a metal oxide, and the metal powder may be sintered in the irradiation of the metal powder with microwaves.

In the above method for producing a metal solid, the high-melting-point material may be in the form of a mold or a container.

In the above method for producing a metal solid, the metal powder may be in the form of a green compact.

The method for producing a metal solid may further include applying a pressure to the metal powder before irradiating the metal powder with microwaves.

In the above method for producing a metal solid, the pressure may be from 0.1 MPa to 2000 MPa.

The above method for producing a metal solid may further include applying a pressure to the metal powder while irradiating the metal powder with microwaves.

In the above method for producing a metal solid, the pressure may be from 0.1 MPa to 2000 MPa.

The above method for producing a metal solid may further include applying a pressure to the metal powder after irradiating the metal powder with microwaves.

In the above method for producing a metal solid, the pressure may be from 0.1 MPa to 2000 MPa.

In the above method for producing a metal solid, the irradiating the metal powder with microwaves may be performed in an inert gas atmosphere.

In the above method for producing a metal solid, the irradiating the metal powder with microwaves may be performed in a reducing atmosphere.

In the above method for producing a metal solid, the metal powder may include a metal oxide, and the method may further include reducing the metal oxide before irradiating the metal powder with microwaves.

In the above method for producing a metal solid, the covering at least a portion of the periphery of the metal powder with a high-melting-point material having a melting point higher than the melting point of the metal powder may include forming a layer of the high-melting-point material; forming a recess in the layer of the high-melting-point material; and placing the metal powder in the recess.

In the above method for producing a metal solid, the forming the recess in the layer of the high-melting-point material may include curing a portion of the layer of the high-melting-point material; and removing an uncured portion of the layer of the high-melting-point material.

In the above method for producing a metal solid, the curing the portion of the layer of the high-melting-point material may include incorporating a curable material into the portion of the layer of the high-melting-point material.

In the above method for producing a metal solid, the portion of the layer of the high-melting-point material may be impregnated with the curable material.

In the above method for producing a metal solid, the portion of the layer of the high-melting-point material may be cured by light irradiation.

Another aspect of the present disclosure provides a device for producing a metal solid, the device including a stage on which a metal powder and a high-melting-point material covering at least a portion of the periphery of the metal powder and having a melting point higher than the melting point of the metal powder are placed; and a microwave irradiator for irradiating the metal powder, at least a portion of the periphery of which is covered with the high-melting-point material, with microwaves to heat the metal powder, thereby sintering or melt-solidifying the metal powder.

The above device for producing a metal solid may further include a high-melting-point material placement unit for placing the high-melting-point material on the stage.

In the above device for producing a metal solid, the high-melting-point material placement unit may apply the high-melting-point material onto the stage.

In the above device for producing a metal solid, the high-melting-point material placement unit may laminate a layer of the high-melting-point material on the stage.

The above device for producing a metal solid may further include a curable material addition unit for adding a curable material to at least a portion of the high-melting-point material.

The above device for producing a metal solid may further include a curing device for curing at least a portion of the high-melting-point material.

The above device for producing a metal solid may further include an uncured material remover for removing the high-melting-point material that is uncured.

The above device for producing a metal solid may further include a metal powder placement unit for placing the metal powder on the stage.

In the above device for producing a metal solid, the metal powder placement unit may apply the metal powder onto the stage.

In the above device for producing a metal solid, the metal powder placement unit may place the metal powder in a recess of the high-melting-point material.

The above device for producing a metal solid may further include a pressurizer for applying a pressure to the metal powder placed on the stage.

In the above device for producing a metal solid, the pressurizer may apply a pressure to the metal powder before the microwave irradiator irradiates the metal powder with microwaves.

In the above device for producing a metal solid, the pressurizer may apply a pressure to the metal powder while the microwave irradiator irradiates the metal powder with microwaves.

In the above device for producing a metal solid, the pressurizer may apply a pressure to the metal powder after the microwave irradiator irradiates the metal powder with microwaves.

The above device for producing a metal solid may further include an inert gas supplier for supplying an inert gas to the metal powder.

The above device for producing a metal solid may further include a reducing gas supplier for supplying a reducing gas to the metal powder.

The above device for producing a metal solid may further include a high-melting-point material placement unit for placing the high-melting-point material on the stage; and a metal powder placement unit for placing the metal powder on the stage, wherein (1) the high-melting-point material placement unit and the metal powder placement unit may place the metal powder surrounded by the high-melting-point material on the stage, and (2) the microwave irradiator may sinter or melt-solidify the metal powder. The device for producing a metal solid may repeat a combination of (1) and (2).

In the above device for producing a metal solid, the metal powder may include a metal oxide, and the device may further include a reduction device that reduces the metal oxide before the microwave irradiator irradiates the metal powder with microwaves.

An aspect of the present disclosure provides a method for producing a joined solid, the method including placing a metal powder on a solid; covering at least a portion of the periphery of the metal powder with a high-melting-point material having a melting point higher than the melting point of the metal powder; and irradiating the metal powder, at least a portion of the periphery of which is covered with the high-melting-point material, with microwaves to heat the metal powder, thereby sintering or melt-solidifying the metal powder to form a metal solid on the solid.

The above method for producing a joined solid may further include placing the metal powder on the metal solid; covering at least a portion of the periphery of the metal powder on the metal solid with the high-melting-point material; and irradiating the metal powder, at least a portion of the periphery of which is covered with the high-melting-point material, on the metal solid with microwaves to heat the metal powder, thereby sintering or melt-solidifying the metal powder to form an additional metal solid on the metal solid.

In the above method for producing a joined solid, laminated metal solids may be formed.

In the above method for producing a joined solid, the high-melting-point material may include an insulation material that has a lower degree of absorption of the microwaves than the metal powder.

In the above method for producing a joined solid, the high-melting-point material may include an absorbent material that absorbs the microwaves in a temperature zone at least a portion of which is lower than a temperature zone in which the metal powder absorbs the microwaves.

In the above method for producing a joined solid, the high-melting-point material may include an insulation material that has a lower degree of absorption of the microwaves than the metal powder; and an absorbent material that absorbs the microwaves in a temperature zone at least a portion of which is lower than a temperature zone in which the metal powder absorbs the microwaves.

In the above method for producing a joined solid, the high-melting-point material may include from 1 mass % to 70 mass % of the absorbent material.

In the above method for producing a joined solid, the insulation material may include an oxide.

In the above method for producing a joined solid, the insulation material may include at least one selected from the group consisting of aluminum oxide, silicon oxide, magnesium oxide, zirconium oxide, and titanium oxide.

The absorbent material may include a carbon material.

In the above method for producing a joined solid, the absorbent material may include at least one selected from the group consisting of carbon, graphite, silicon carbide, carbon resin, and metal carbide.

In the above method for producing a joined solid, the metal powder may include a metal.

In the above method for producing a joined solid, the metal powder may include at least one selected from the group consisting of iron, nickel, copper, gold, silver, aluminum, and cobalt.

In the above method for producing a joined solid, the metal powder may include a metal compound.

In the above method for producing a joined solid, the metal powder may include a compound of at least one selected from the group consisting of iron, nickel, copper, gold, silver, aluminum, and cobalt.

In the above method for producing a joined solid, the metal powder may further include an alloy component.

In the above method for producing a joined solid, the alloy component may include at least one selected from the group consisting of silicon, manganese, chromium, nickel, carbon, boron, copper, aluminum, titanium, niobium, vanadium, zinc, and sulfur.

In the above method for producing a joined solid, the metal powder may have an average particle size of 200 µm or less.

In the above method for producing a joined solid, the metal powder may include a metal oxide, and the metal powder may be reduced in the irradiation of the metal powder with microwaves.

In the above method for producing a joined solid, the metal powder may include a metal oxide, and the metal powder may be sintered in the irradiation of the metal powder with microwaves.

In the above method for producing a joined solid, the high-melting-point material may be in the form of a mold or a container.

In the above method for producing a joined solid, the metal powder may be in the form of a green compact.

The above method for producing a joined solid may further include applying a pressure to the metal powder before irradiating the metal powder with microwaves.

In the above method for producing a joined solid, the pressure may be from 0.1 MPa to 2000 MPa.

The above method for producing a joined solid may further include applying a pressure to the metal powder while irradiating the metal powder with microwaves.

In the above method for producing a joined solid, the pressure may be from 0.1 MPa to 2000 MPa.

The above method for producing a joined solid may further include applying a pressure to the metal powder after irradiating the metal powder with microwaves.

In the above method for producing a joined solid, the pressure may be from 0.1 MPa to 2000 MPa.

In the above method for producing a joined solid, the irradiating the metal powder with microwaves may be performed in an inert gas atmosphere.

In the above method for producing a joined solid, the irradiating the metal powder with microwaves may be performed in a reducing atmosphere.

In the above method for producing a joined solid, the metal powder may include a metal oxide, and the method may further include reducing the metal oxide before irradiating the metal powder with microwaves.

In the above method for producing a joined solid, the covering at least a portion of the periphery of the metal powder with a high-melting-point material having a melting point higher than the melting point of the metal powder may include forming a layer of the high-melting-point material; forming a recess in the layer of the high-melting-point material; and placing the solid and the metal powder in the recess.

In the above method for producing a joined solid, the forming the recess in the layer of the high-melting-point material may include curing a portion of the layer of the high-melting-point material; and removing an uncured portion of the layer of the high-melting-point material.

In the above method for producing a joined solid, the curing the portion of the layer of the high-melting-point material may include incorporating a curable material into the portion of the layer of the high-melting-point material.

In the above method for producing a joined solid, the portion of the layer of the high-melting-point material may be impregnated with the curable material.

In the above method for producing a joined solid, the portion of the layer of the high-melting-point material may be cured by light irradiation.

Another aspect of the present disclosure provides a method for producing a joined solid, the method including placing a metal for bonding between a first solid and a second solid; covering at least a portion of the periphery of the metal for bonding with a high-melting-point material having a melting point higher than the melting point of the metal for bonding; and irradiating the metal for bonding, at least a portion of the periphery of which is covered with the high-melting-point material, with microwaves to heat the metal for bonding, thereby sintering or melt-solidifying the metal for bonding to bond the first solid and the second solid.

In the above method for producing a joined solid, the metal for bonding may be a powder.

In the above method for producing a joined solid, the metal for bonding may be a solid.

In the above method for producing a joined solid, the metal for bonding may be a liquid.

In the above method for producing a joined solid, the high-melting-point material may include an insulation material that has a lower degree of absorption of the microwaves than the metal for bonding.

In the above method for producing a joined solid, the high-melting-point material may include an absorbent material that absorbs the microwaves in a temperature zone at least a portion of which is lower than a temperature zone in which the metal for bonding absorbs the microwaves.

In the above method for producing a joined solid, the high-melting-point material may include an insulation material that has a lower degree of absorption of the microwaves than the metal for bonding; and an absorbent material that absorbs the microwaves in a temperature zone at least a portion of which is lower than a temperature zone in which the metal for bonding absorbs the microwaves.

In the above method for producing a joined solid, the high-melting-point material may include from 1 mass % to 70 mass % of the absorbent material.

In the above method for producing a joined solid, the insulation material may include an oxide.

In the above method for producing a joined solid, the insulation material may include at least one selected from the group consisting of aluminum oxide, silicon oxide, magnesium oxide, zirconium oxide, and titanium oxide.

In the above method for producing a joined solid, the absorbent material may include a carbon material.

In the above method for producing a joined solid, the absorbent material may include at least one selected from the group consisting of carbon, graphite, silicon carbide, carbon resin, and metal carbide.

In the above method for producing a joined solid, the metal for bonding may include a metal.

In the above method for producing a joined solid, the metal for bonding may include at least one selected from the group consisting of iron, nickel, copper, gold, silver, aluminum, and cobalt.

In the above method for producing a joined solid, the metal for bonding may include a metal compound.

In the above method for producing a joined solid, the metal for bonding may include a compound of at least one selected from the group consisting of iron, nickel, copper, gold, silver, aluminum, and cobalt.

In the above method for producing a joined solid, the metal for bonding may further include an alloy component.

In the above method for producing a joined solid, the alloy component may include at least one selected from the group consisting of silicon, manganese, chromium, nickel, carbon, boron, copper, aluminum, titanium, niobium, vanadium, zinc, and sulfur.

In the above method for producing a joined solid, the metal for bonding may be a powder, and the metal for bonding may have an average particle size of 200 μm or less.

In the above method for producing a joined solid, the metal for bonding may include a metal oxide, and the metal for bonding may be reduced in the irradiation of the metal for bonding with microwaves.

In the above method for producing a joined solid, the metal for bonding may include a metal oxide, and the metal for bonding may be sintered in the irradiation of the metal for bonding with microwaves.

In the above method for producing a joined solid, the high-melting-point material may be in the form of a mold or a container.

In the above method for producing a joined solid, the metal for bonding may be in the form of a green compact.

The above method for producing a joined solid may further include applying a pressure to the metal for bonding before irradiating the metal for bonding with microwaves.

In the above method for producing a joined solid, the pressure may be from 0.1 MPa to 2000 MPa.

The above method for producing a joined solid may further include applying a pressure to the metal powder while irradiating the metal powder with microwaves.

In the above method for producing a joined solid, the pressure may be from 0.1 MPa to 2000 MPa.

The above method for producing a joined solid may further include applying a pressure to the metal for bonding after irradiating the metal for bonding with microwaves.

In the above method for producing a joined solid, the pressure may be from 0.1 MPa to 2000 MPa.

In the above method for producing a joined solid, the irradiating the metal for bonding with microwaves may be performed in an inert gas atmosphere.

In the above method for producing a joined solid, the irradiating the metal for bonding with microwaves may be performed in a reducing atmosphere.

In the above method for producing a joined solid, the metal for bonding may include a metal oxide, and the method may further include reducing the metal oxide before irradiating the metal for bonding with microwaves.

In the above method for producing a joined solid, the covering at least a portion of the periphery of the metal for bonding with a high-melting-point material having a melting point higher than the melting point of the metal for bonding may include forming a layer of the high-melting-point material; forming a recess in the layer of the high-melting-point material; and placing the first and second solids and the metal for bonding in the recess.

In the above method for producing a joined solid, the forming the recess in the layer of the high-melting-point material may include curing a portion of the layer of the high-melting-point material; and removing an uncured portion of the layer of the high-melting-point material.

In the above method for producing a joined solid, the curing the portion of the layer of the high-melting-point material may include incorporating a curable material into the portion of the layer of the high-melting-point material.

In the above method for producing a joined solid, the portion of the layer of the high-melting-point material may be impregnated with the curable material.

In the above method for producing a joined solid, the portion of the layer of the high-melting-point material may be cured by light irradiation.

Advantageous Effects

According to the present disclosure, it is possible to provide a method for producing a metal solid, the method being capable of easily producing a metal solid. Further, according to the present disclosure, it is possible to provide a method for producing a joined solid, the method being capable of easily bonding a metal solid to a solid, and a method for producing a joined solid, the method being capable of easily bonding solids together.

BRIEF DESCRIPTION OF DRAWINGS

FIG. 6 is a schematic process diagram of a method for producing a metal solid according to the first embodiment.

FIG. 11 shows photographs of a metal solid obtained in Example 1.

DESCRIPTION OF EMBODIMENTS

Figure 1:
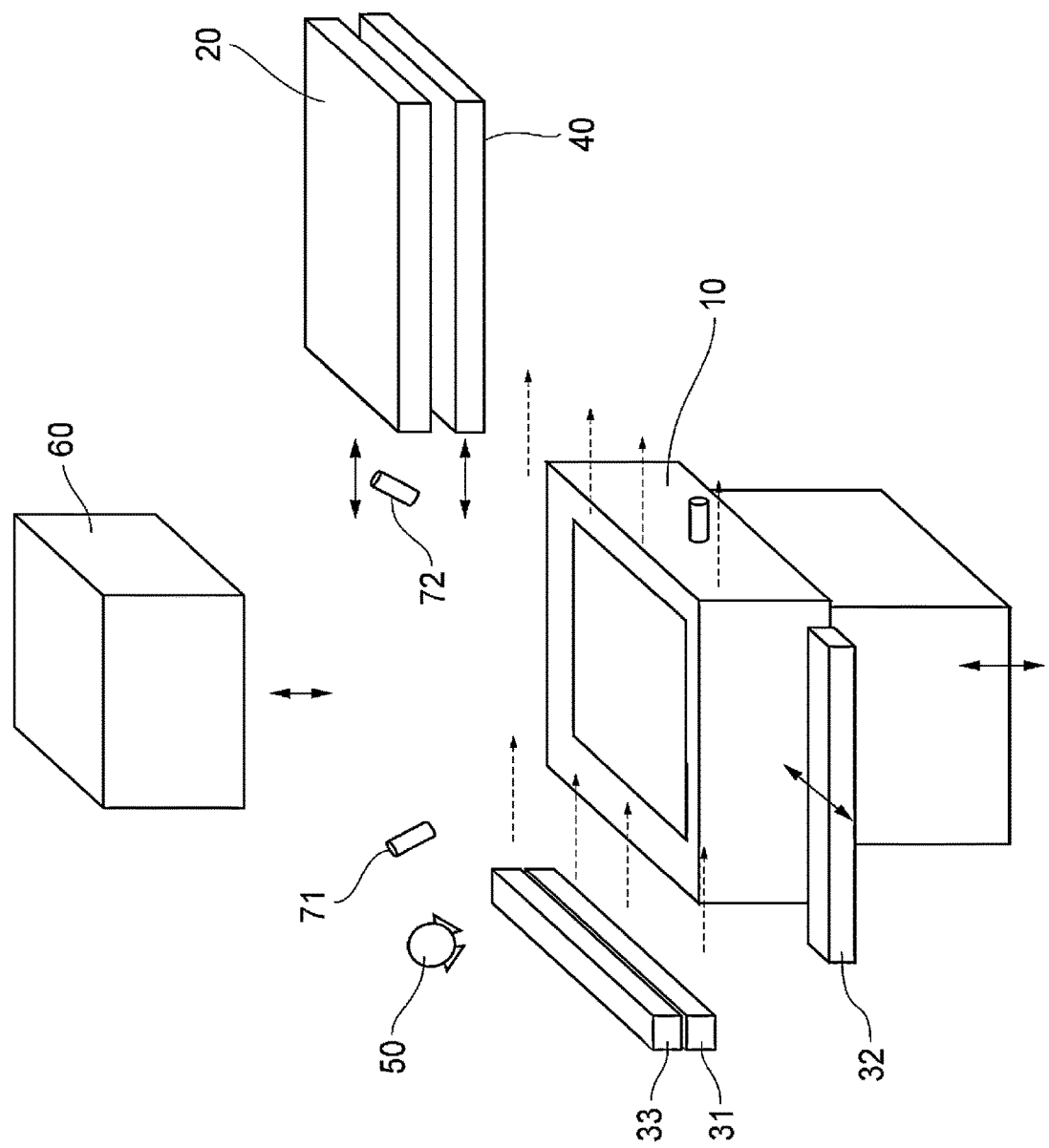
FIG. 1 is a schematic perspective view of a device for producing a metal solid according to a first embodiment.

An embodiment of the present disclosure will be described below with reference to the drawings. In the description of the drawings below, the same or similar parts are denoted by the same or similar reference numerals. However, the drawings are schematic. Therefore, dimensions and the like may be determined by referring to the following description. Needless to say, there are parts with different dimensional relationships and ratios between the drawings.

First Embodiment

A method for producing a metal solid according to a first embodiment includes covering at least a portion of the periphery of a metal powder with a high-melting-point material having a melting point higher than the melting point of the metal powder, and irradiating the metal powder, at least a portion of the periphery of which is covered with the high-melting-point material, with microwaves to heat the metal powder, thereby sintering or melt-solidifying the metal powder. The microwaves are, for example, electromagnetic waves with a frequency of 300 MHz or more and 30 GHz or less. In the portion of the metal powder covered with the high-melting-point material, the metal powder and the high-melting-point material are preferably in close contact with each other.

The material of the metal powder may contain a metal simple substance, or a metal compound such an alloy. Examples of metals include iron (Fe), nickel (Ni), copper (Cu), gold (Au), silver (Ag), aluminum (Al), and cobalt (Co). The sintering temperature of iron (Fe) is, for example, 1200° C. The melting point of iron (Fe) is 1538° C. The sintering temperature of nickel (Ni) is, for example, 1200° C. The melting point of nickel (Ni) is 1495° C. The sintering temperature of copper (Cu) is, for example, 800° C. The melting point of copper (Cu) is 1085° C. The sintering temperature of gold (Au) is, for example, 800° C. The melting point of gold (Au) is 1064° C. The sintering temperature of silver (Ag) is, for example, 750° C. The melting point of silver (Ag) is 962° C. The sintering temperature of aluminum (Al) is, for example, 500° C. The melting point of aluminum (Al) is 660° C. The sintering temperature of cobalt (Co) is, for example, 1100° C. The melting point of cobalt (Co) is 1455° C.

The material of the metal powder may contain one type of metal, or may contain a plurality of types of metals. Examples of metal compounds include, but are not particularly limited to, an alloy composed of a plurality of metal elements, an alloy composed of a metal element and a non-metal element, metal oxides, metal hydroxides, metal chlorides, metal carbides, metal borides, and metal sulfides. The metal powder may contain, as alloy components, for example, silicon (Si), manganese (Mn), chromium (Cr), nickel (Ni), carbon (C), boron (B), copper (Cu), aluminum (Al), titanium (Ti), niobium (Nb), vanadium (V), zinc (Zn), and sulfur (S). The material of the metal powder preferably has more excellent microwave absorption characteristics than the surrounding high-melting-point material. Consequently, the metal powder is more easily heated with microwaves than the surrounding high-melting-point material.

The average particle size of the metal powder is, for example, 200 μm or less, 190 μm or less, or 180 μm or less. The average particle size of the metal powder refers to, for example, the median diameter $D_{50}$ in the volume-based cumulative particle size distribution measured by a laser diffraction/scattering method. The particle size distribution of the metal powder is preferably $D_{10}/D_{50}>0.5$ and $D_{50}/D_{90}>0.5$. When the average particle size of the metal powder is 200 μm or less, the metal powder tends to easily absorb microwaves.

The high-melting-point material may contain an insulation material that has higher microwave permeability than the metal powder and that has a lower degree of absorption of microwaves than the metal powder. The insulation material has a melting point higher than the melting point of the metal powder. The insulation material that has a lower degree of absorption of microwaves generates heat at a low degree even when irradiated with microwaves, and exhibits an insulation effect. Further, the insulation material, which has a melting point higher than the metal powder, has a stable shape even when irradiated with microwaves. Therefore, while the metal powder irradiated with microwaves is sintered or melt-solidified, the high-melting-point material containing the insulation material can have a stable shape.

The insulation material may contain an oxide of a metal or an oxide of a semi-metal. Examples of oxides of metals and semi-metals include, but are not particularly limited to, aluminum oxide ($Al_2O_3$), silicon oxide ($SiO_2$), magnesium oxide (MgO), zirconium oxide ($ZrO_2$), and titanium oxide ($TiO_2$). For example, the melting point of aluminum oxide ($Al_2O_3$) is 2072° C. The melting point of silicon oxide ($SiO_2$) is 1710° C. The melting point of magnesium oxide (MgO) is 2852° C. The insulation material may be a compound of these.

The high-melting-point material may contain an absorbent material that absorbs microwaves in a temperature zone at least a portion of which is lower than a temperature zone in which the metal powder absorbs microwaves. The absorbent material has a melting point higher than the melting point of the metal powder. At least a portion of the temperature zone in which the absorbent material absorbs microwaves is lower than the temperature zone in which the metal powder absorbs microwaves. The temperature zone in which the metal powder absorbs microwaves is, for example, 300° C. or more and 1200° C. or less, 450° C. or more and 1100° C. or less, or 600° C. or more and 800° C. or less. The temperature zone in which the absorbent material absorbs microwaves is, for example, 100° C. or more and 1000° C. or less, 250° C. or more and 900° C. or less, or 400° C. or more and 600° C. or less.

At least a portion of the temperature zone in which the absorbent material absorbs microwaves preferably overlaps with the temperature zone in which the metal powder absorbs microwaves. Since the absorbent material absorbs microwaves in the temperature zone at least a portion of which is lower than the temperature zone in which the metal powder absorbs microwaves, the absorbent material generates heat faster than the metal powder. Accordingly, the absorbent material can heat the metal powder before its temperature reaches the temperature zone in which the metal powder absorbs microwaves. Therefore, when the high-melting-point material contains an absorbent material, the temperature of the metal powder faster reaches the temperature zone in which it absorbs microwaves, and the heating time of the metal powder can be shortened. Moreover, since the absorbent material absorbs microwaves in the temperature zone at least a portion of which is lower than the temperature zone in which the metal powder absorbs microwaves, it is possible to suppress the high-melting-point material from being heated more than necessary. Therefore, while the metal powder irradiated with microwaves is sintered or melt-solidified, the high-melting-point material containing an absorbent material can have a stable shape.

The absorbent material contains, for example, a carbon material. Examples of the carbon material include, but are not particularly limited to, carbon black, amorphous carbon, graphite, silicon carbide, carbon resin, and metal carbide. The absorbent material may be a compound of these. The absorbent material preferably does not contain a volatile component. Because the absorbent material does not contain a volatile component, it is possible to avoid the absorption of microwaves by the volatile component.

The high-melting-point material may contain a reduction material that reduces the metal powder. The reduction material has a melting point higher than the melting point of the metal powder. Examples of the reduction material include carbon and silicon carbide. The carbon material used as an absorbent material can also function as a reduction material.

The high-melting-point material may consist of an insulation material, may consist of an absorbent material, may consist of a reduction material, or may include a combination of these materials. The insulation material, the absorbent material, and the reduction material each may have overlapping properties and functions. For example, the carbon material functions as an absorbent material, and also functions as a reduction material.

When the high-melting-point material contains an insulation material and an absorbent material, it is preferable that the mass ratio of the insulation material and the absorbent material is 1:1, or that the mass ratio of the insulation material is higher than the mass ratio of the absorbent material. For example, the mass ratio of the absorbent material in the high-melting-point material is 1 mass % or more, 2 mass % or more, or 5 mass % or more, and is 70 mass % or less, 50 mass % or less, 40 mass % or less, 30 mass % or less, 20 mass % or less, or 10 mass % or less. By setting the mass ratio of the absorbent material in the high-melting-point material to 50 mass % or less, it is possible to ensure microwave permeability in the high-melting-point material, and to make the rate of sintering or melt-solidifying the metal powder appropriate.

When the metal powder irradiated with microwaves is a green compact, the high-melting-point material may be a solid powder or the like, and may have flowability. After the metal powder is molded into a green compact with a desired three-dimensional shape, at least a portion of the green compact is covered with a high-melting-point material, the green compact covered with the high-melting-point material is then irradiated with microwaves to sinter the green compact, and by metallurgy, a metal solid of a desired shape is produced. Alternatively, the green compact covered with the high-melting-point material is irradiated with microwaves, and then cooled to melt-solidify the green compact, and a metal solid of a desired shape is produced. The entire periphery of the green compact may be covered with the high-melting-point material. The thickness, volume, etc. of the high-melting-point material covering the green compact can be appropriately set based on microwave permeability.

When the metal powder is molded into a green compact, a pressure of, for example, 0.1 MPa or more, 1 MPa or more, 100 MPa or more, or 200 MPa or more, and 2000 MPa or less, 1900 MPa or less, or 1800 MPa or less, may be applied to the metal powder. By pressurization, the metal solid to be produced tends to be dense. Examples of the pressurization method include uniaxial molding, cold isostatic pressing (CIP) molding, hot isostatic pressing (HIP) molding, roller pressurization, and the like.

When the metal powder irradiated with microwaves has flowability, the high-melting-point material may be in the form of a solid, such as a mold or container. For example, the entire metal powder irradiated with microwaves may be a powder, or a portion of the metal powder may be a green compact. The metal powder is placed in the recess of a mold or container made of the high-melting-point material and corresponding to a desired three-dimensional shape, at least a portion of the metal powder is covered with the mold or container made of the high-melting-point material, and the metal powder covered with the mold or container made of the high-melting-point material is then irradiated with microwaves, thereby sintering the metal powder, and a metal solid of a desired shape is produced. In the present disclosure, the recess includes a through hole. Alternatively, the metal powder covered with the high-melting-point material is irradiated with microwaves, and then cooled, thereby melt-solidifying the green compact, and a metal solid of a desired shape is produced. The entire periphery of the metal powder may be covered with the mold or container made of the high-melting-point material. The thickness, volume, etc. of the mold or container made of the high-melting-point material covering the green compact can be appropriately set based on microwave permeability. The composition of the metal powder to be placed in the mold or container made of the high-melting-point material may be changed depending on the position. For example, the type of metal forming the metal powder and the alloy component of the metal powder may be changed depending on the position.

After the metal powder is placed in the mold or container made of the high-melting-point material, and before the meatal powder is irradiated with microwaves, a pressure of, for example, 0.1 MPa or more, 1 MPa or more, 100 MPa or more, or 200 MPa or more, and 2000 MPa or less, 1900 MPa or less, or 1800 MPa or less, may be applied to the metal powder. By pressurization, the metal solid to be produced tends to be dense. Examples of the pressurization method include uniaxial molding, cold isostatic pressing (CIP) molding, hot isostatic pressing (HIP) molding, roller pressurization, and the like.

When the high-melting-point material is formed into a solid, such as a mold or container, a curable material, such as a photocurable resin, may be dispersed in the high-melting-point material, and the mixture of the high-melting-point material and the photocurable resin may be irradiated with light to cure the mixture of the high-melting-point material and the photocurable resin. When the photocurable resin is an ultraviolet ray-curable resin, the mixture of the high-melting-point material and the photocurable resin is irradiated with ultraviolet rays. The light irradiation time is, for example, 1 hour or more, 2 hours or more, or 3 hours or more. The mass ratio of the photocurable resin in the mixture of the high-melting-point material and the photocurable resin is, for example, 1% or more, 2% or more, or 3% or more, and is 10% or less, 9% or less, or 8% or less. By setting the mass ratio of the photocurable resin in the mixture of the high-melting-point material and the photocurable resin to 1% or more and 10% or less, it is possible to ensure hardness and microwave permeability. The curable material may be thermosetting. In this case, the mixture of the high-melting-point material and the thermosetting material may be heated to cure the mixture of the high-melting-point material and the thermosetting material.

When the metal powder irradiated with microwaves and the high-melting-point material are both powders, the metal powder and the high-melting-point material may be laminated, and the laminated metal powder and high-melting-point material may be then irradiated with microwaves. After the metal powder and the high-melting-point material are laminated, and before they are irradiated with microwaves, for example, a pressure of 0.1 MPa or more, 1 MPa or more, 100 Mpa or more, or 200 Mpa or more, and 2000 Mpa or less, 1900 Mpa or less, or 1800 Mpa or less, may be applied to the laminated metal powder and high-melting-point material. By pressurization, the metal solid to be produced tends to be dense. Examples of the pressurization method include uniaxial molding, cold isostatic pressing (CIP) molding, hot isostatic pressing (HIP) molding, roller pressurization, and the like.

While the metal powder is irradiated with microwaves, a pressure may be applied to the metal powder. The pressure to be applied is, for example, 0.1 MPa or more, 1 Mpa or more, 100 Mpa or more, or 200 Mpa or more, and is 2000 Mpa or less, 1900 Mpa or less, or 1800 Mpa or less.

After the metal powder is sintered or melt-solidified, a pressure may be applied to the formed metal solid. In this case, a pressure is preferably applied while the metal solid has heat before being cooled to the atmospheric temperature, and while the temperature is higher than the atmospheric temperature. The pressure to be applied is, for example, 0.1 MPa, 1 MPa or more, 100 MPa or more, or 200 MPa or more, and is 2000 MPa or less, 1900 MPa or less, or 1800 MPa or less. By pressurization, the metal solid to be produced tends to be dense. Examples of the pressurization method include uniaxial molding, cold isostatic pressing (CIP) molding, hot isostatic pressing (HIP) molding, roller pressurization, and the like.

When the metal powder contains a metal oxide, the metal powder covered with the high-melting-point material containing a reduction material is irradiated with microwaves to thereby reduce the metal oxide. When the metal powder is heated to a temperature equal to or higher than the sintering temperature and around the melting point, a dense sintered body is likely to be obtained. Therefore, the metal powder may be heated with microwaves to 1400° C. or more, or 1500° C. or more. When the metal powder is melt-solidified, the metal powder may be heated to a temperature equal to or higher than the melting point. Before the metal powder is irradiated with microwaves, an oxide powder of the metal may be reduced in advance. For example, a metal oxide powder can be reduced by mixing the metal oxide powder with a carbon powder, and heating the mixture of the metal oxide powder and the carbon powder. The reduced metal powder can be separated from the carbon powder by using, for example, a magnet.

The metal powder may be heated in an inert gas atmosphere. Examples of the inert gas include argon (Ar) and helium (He). The metal powder may also be heated in a neutral gas atmosphere. Examples of the neutral gas include nitrogen ($N_2$), dry hydrogen ($H_2$), and ammonia ($NH_3$). The metal powder may also be heated in a reducing atmosphere. Examples of the reducing gas that provides a reducing atmosphere include hydrogen ($H_2$), carbon monoxide (CO), and hydrocarbon gases ($CH_4$, $C_3H_8$, $C_4H_{10}$, etc.). When the high-melting-point material is in the form of a mold or container, an inert gas, a neutral gas, or a reducing gas may be supplied into the mold or container made of the high-melting-point material.

The covering at least a portion of the periphery of a metal powder with a high-melting-point material, and the sintering or melt-solidifying the metal powder may be repeated to form laminated metal solids. The metal solids obtained by the above method may also be polished. Alternatively, a metal solid obtained by the above method is used, for example, as a core, a metal powder is arranged around the core, and a high-melting-point material is further arranged around the metal powder, followed by irradiation with microwaves; this operation may be repeated. As a result, it is possible to scale up the metal solids. In addition, every time microwaves are applied, the compositions of the metal powder and the high-melting-point material may be each changed. For example, every time microwaves are applied, the alloy component of the metal powder may be changed.

A device for producing a metal solid according to the first embodiment includes, as shown in FIG. 1, a stage 10 on which a metal powder and a high-melting-point material covering at least a portion of the periphery of the metal powder and having a melting point higher than the melting point of the metal powder are placed, and a microwave irradiator 20 for irradiating the metal powder, at least a portion of the periphery of which is covered with the high-melting-point material, with microwaves to heat the metal powder, thereby sintering or melt-solidifying the metal powder. The device for producing a metal solid according to the first embodiment can perform, for example, the method for producing a metal solid according to the first embodiment described above.

The stage 10 is not particularly limited as long as the metal powder and the high-melting-point material can be placed thereon. The stage 10 may be movable in three mutually perpendicular directions. For example, the stage 10 may be movable in the gravity direction and horizontal direction.

Figure 2:
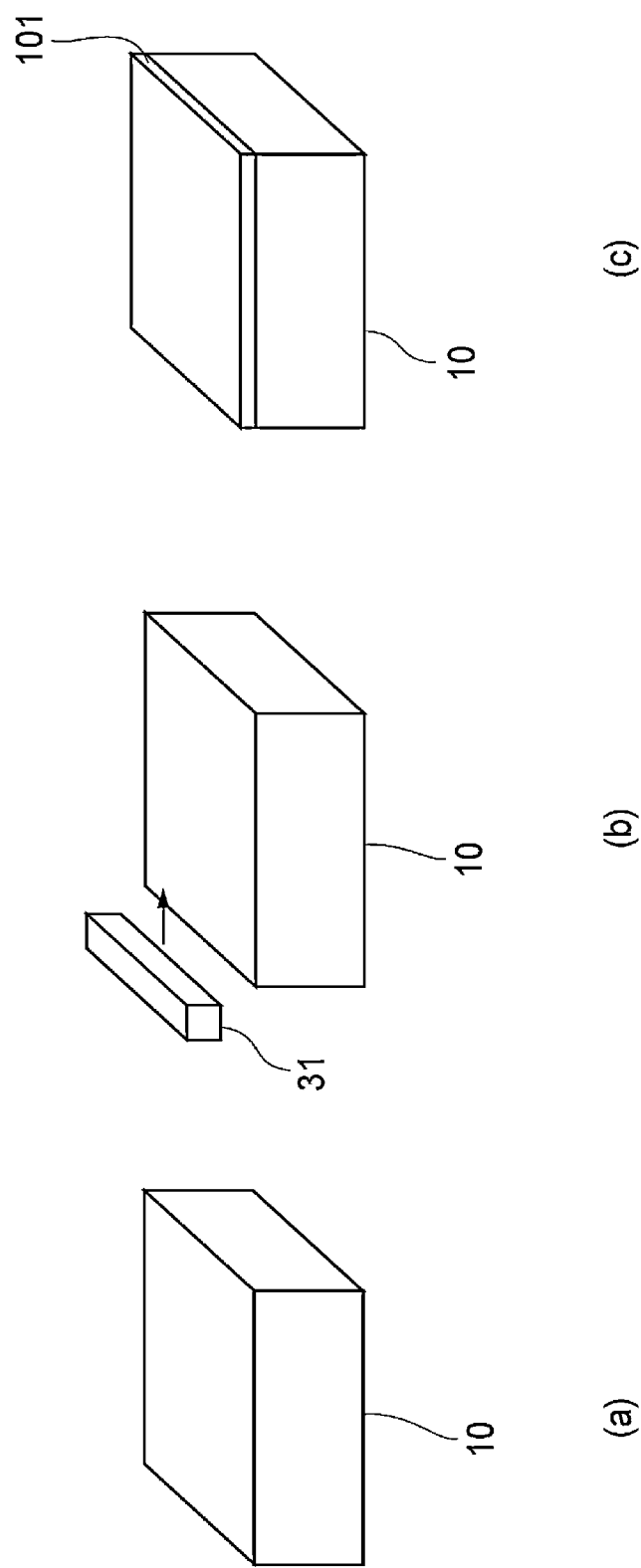
FIG. 2 is a schematic process diagram of a method for producing a metal solid according to the first embodiment.

The device for producing a metal solid according to the first embodiment may further include a high-melting-point material placement unit 31 that places a high-melting-point material on the stage 10. The high-melting-point material placement unit 31 may apply the high-melting-point material onto the stage 10. The high-melting-point material placement unit 31 may form a layer of the high-melting-point material on the stage 10. The high-melting-point material placement unit 31 may be movable in three mutually perpendicular directions. For example, the high-melting-point material placement unit 31 may be movable in the gravity direction and horizontal direction. For example, as shown in FIG. 2 (a) to 2 (c), the high-melting-point material placement unit 31 may apply powder of the high-melting-point material onto the stage 10 while moving on the stage 10 to form a layer 101 of the high-melting-point material on the stage 10.

Figure 3:
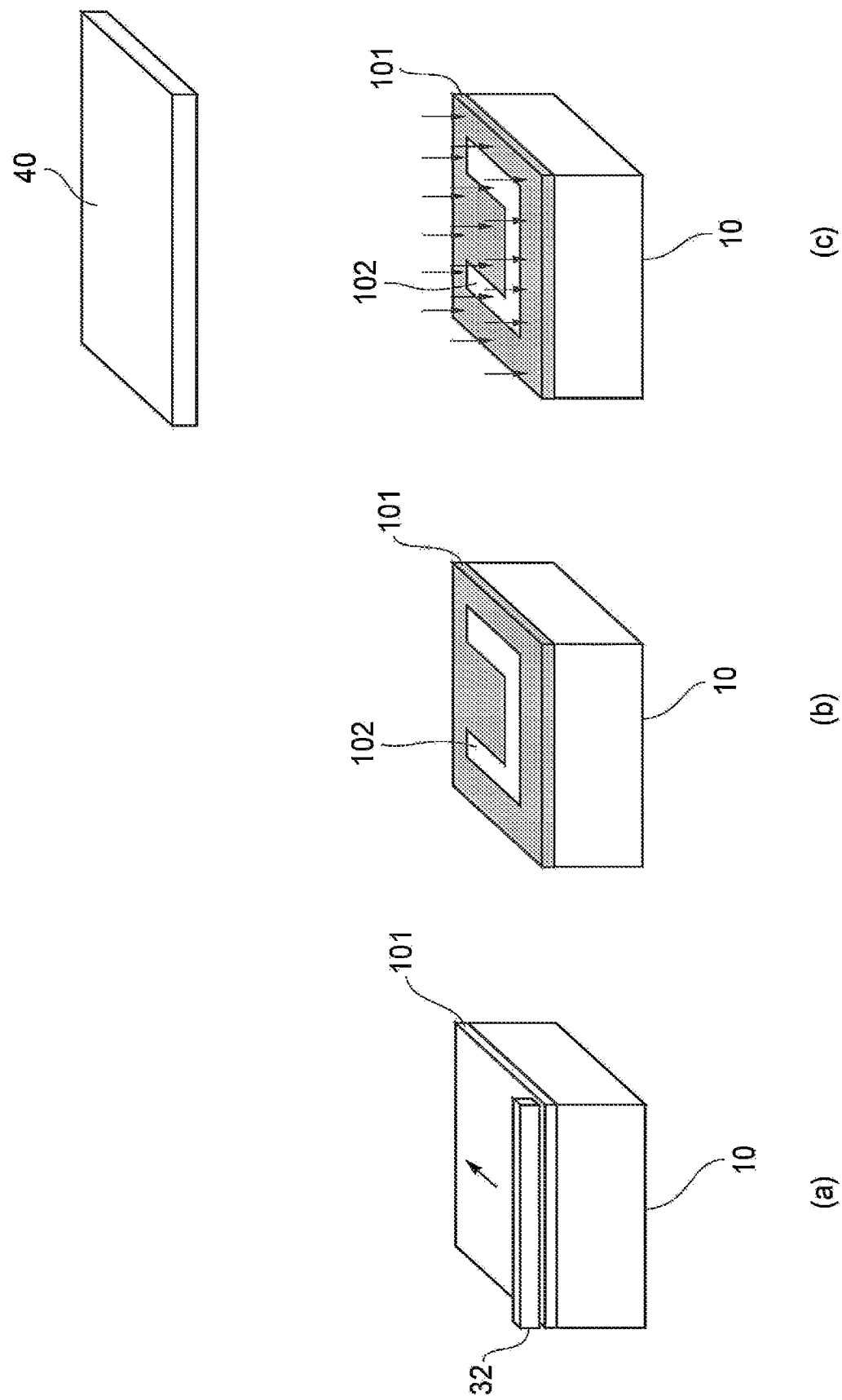
FIG. 3 is a schematic process diagram of a method for producing a metal solid according to the first embodiment.

As shown in FIG. 1, the device for producing a metal solid according to the first embodiment may further include a curable material addition unit 32 that adds a curable material to at least a portion of the high-melting-point material. The curable material addition unit 32 adds the curable material to a portion of the high-melting-point material to be cured, and does not add the curable material to a portion of the high-melting-point material not to be cured. The curable material is, for example, a liquid, and the curable material addition unit 32 may impregnate the portion of the high-melting-point material to be cured with the curable material. The curable material addition unit 32 may be movable in three mutually perpendicular directions. For example, the curable material addition unit 32 may be movable in the gravity direction and horizontal direction. For example, as shown in FIGS. 3 (a) and 3 (b), the curable material addition unit 32 may apply a curable material while patterning to the layer 101 of the high-melting-point material while moving on the layer 101 of the high-melting-point material on the stage 10, may not add the curable material to a portion 102 not to be cured in the layer 101 of the high-melting-point material, and may add the curable material to a portion to be cured in the layer 101 of the high-melting-point material. The curable material addition unit 32 may include, for example, an inkjet nozzle, and may add the curable material to the high-melting-point material by the binder jetting technique.

The high-melting-point material placement unit 31 and the curable material addition unit 32 may be integrated with each other.

As shown in FIG. 1, the device for producing a metal solid according to the first embodiment may further include a curing device 40 that cures at least a portion of the high-melting-point material. When the high-melting-point material contains a photocurable material, the curing device 40 is a light source. When the high-melting-point material contains a thermosetting material, the curing device 40 is a heat source. The curing device 40 may be movable in three mutually perpendicular directions. For example, the curing device 40 may be movable in the gravity direction and horizontal direction. As shown in FIG. 3 (c), the curing device 40 applies energy necessary to cure the curable material to the layer 101 of the high-melting-point material to cure at least a portion of the layer 101 of the high-melting-point material. The curing device 40 may apply energy to the entire surface of the layer 101 of the high-melting-point material, or may apply energy while scanning the layer 101 of the high-melting-point material.

Figure 4:
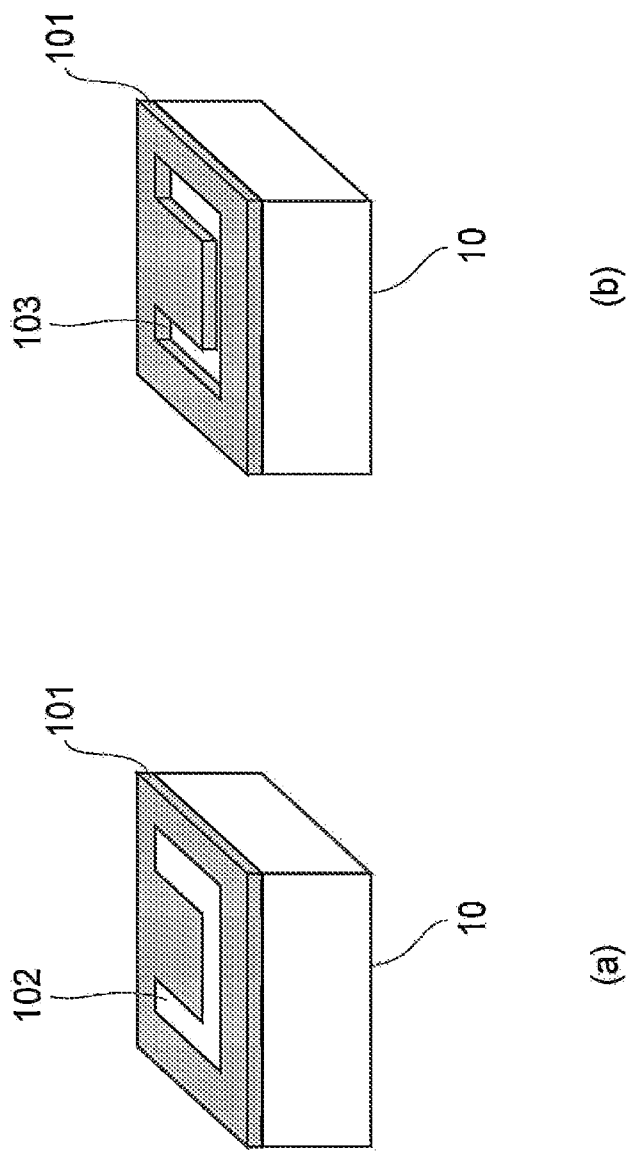
FIG. 4 is a schematic process diagram of a method for producing a metal solid according to the first embodiment.

As shown in FIG. 1, the device for producing a metal solid according to the first embodiment may further include an uncured material remover 50 that removes the uncured high-melting-point material. For example, as shown in FIGS. 4 (a) and 4 (b), the uncured material remover 50 may apply wind pressure to the uncured powder portion 102 of the layer 101 of the high-melting-point material to remove the uncured powder portion 102 from the layer 101 of the high-melting-point material, and may form a recess 103 in the layer 101 of the high-melting-point material.

Figure 5:
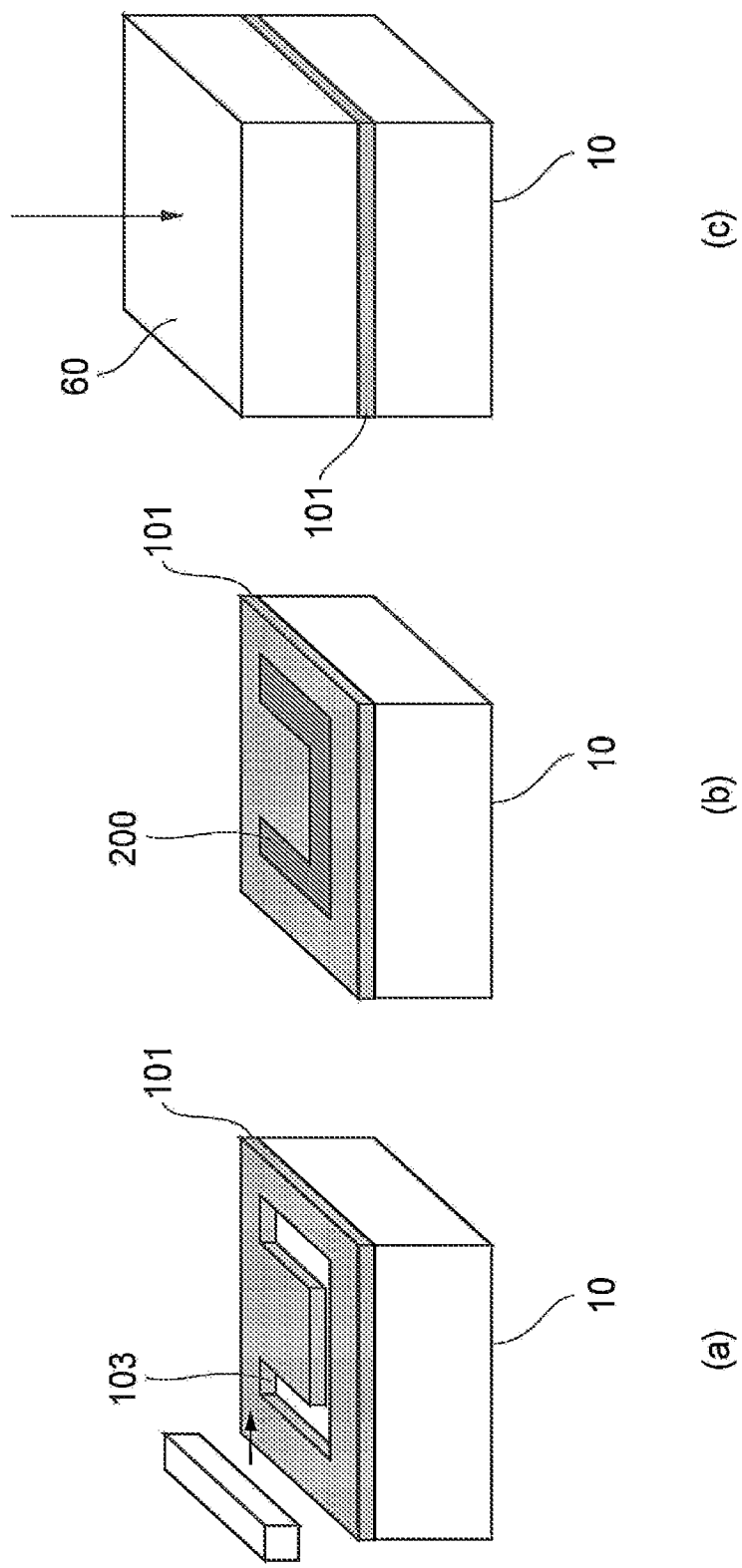
FIG. 5 is a schematic process diagram of a method for producing a metal solid according to the first embodiment.

As shown in FIG. 1, the device for producing a metal solid according to the first embodiment may further include a metal powder placement unit 33 that places the metal powder on the stage 10. A recoater can be used as the metal powder placement unit 33. The metal powder placement unit 33 may apply the metal powder onto the stage 10. The metal powder placement unit 33 may be movable in three mutually perpendicular directions. For example, the metal powder placement unit 33 may be movable in the gravity direction and horizontal direction. For example, as shown in FIGS. 5 (a) and 5 (b), the metal powder placement unit 33 may place the metal powder 200 in the recess 103 of the layer 101 of the high-melting-point material on the stage 10. The metal powder placed on the surface of a portion of the layer 101 of the high-melting-point material on the stage 10 in which the recess 103 is not formed may be removed with a roller, a brush, or the like.

The high-melting-point material placement unit 31 and the metal powder placement unit 33 may be integrated with each other. The curable material addition unit 32 and the metal powder placement unit 33 may be integrated with each other. The high-melting-point material placement unit 31, the curable material addition unit 32, and the metal powder placement unit 33 may be integrated with each other.

As shown in FIG. 1, the device for producing a metal solid according to the first embodiment may further include a pressurizer 60 that applies a pressure to the metal powder placed on the stage 10. As shown in FIG. 5 (c), the pressurizer 60 applies a pressure to the metal powder 200 before irradiation with microwaves. Examples of the pressurization method include uniaxial molding, cold isostatic pressing (CIP) molding, hot isostatic pressing (HIP) molding, roller pressurization, and the like. In the case of roller pressurization, the pressurization tip of the pressurizer 60 may be a roller type, and a pressurization technique that slides the stage 10 while the roller is pressurized on the stage 10 may be selected.

For example, as shown in FIG. 6, the microwave irradiator 20 applies microwaves to the metal powder 200 placed in the recess 103 of the layer 101 of the high-melting-point material on the stage 10. The microwave irradiator 20 may apply microwaves to the entire surface of the metal powder 200 all at once, or may apply microwaves while scanning the metal powder 200. The device for producing a metal solid according to the first embodiment may further include an inert gas supplier that supplies an inert gas to the metal powder. The inert gas supplier supplies an inert gas around the metal powder 200 at least while the metal powder 200 is irradiated with microwaves. The device for producing a metal solid according to the first embodiment may further include a reducing gas supplier that supplies a reducing gas to the metal powder. The reducing gas supplier supplies a reducing gas around the metal powder 200 at least while the metal powder 200 is irradiated with microwaves. The device for producing a metal solid according to the first embodiment may further include a neutral gas supplier that supplies a reducing gas to the metal powder. The neutral gas supplier supplies a neutral gas around the metal powder 200 at least while the metal powder 200 is irradiated with microwaves. The inert gas supplier and the reducing gas supplier may be integrated with each other. The inert gas supplier and the neutral gas supplier may be integrated with each other. The reducing gas supplier and the neutral gas supplier may be integrated with each other.

As shown in FIG. 1, the device for producing a metal solid according to the first embodiment may include a thermometer 71 that measures the temperature of the metal powder placed on the stage 10. A radiation thermometer can be used as the thermometer 71. The radiation thermometer measures the temperature of the metal powder based on the emissivity of the material of the metal powder. The thermometer 71 may also measure the temperature of the high-melting-point material. The microwaves emitted by the microwave irradiator 20 may be controlled based on the temperature of the metal powder measured by the thermometer 71. The device for producing a metal solid according to the first embodiment may also include a microwave detector 72 that detects the microwaves emitted by the microwave irradiator 20. The microwaves emitted by the microwave irradiator 20 may be controlled based on the characteristics of the microwaves detected by the microwave detector 72.

The pressurizer 60 shown in FIG. 1 may apply a pressure to the metal powder 200 after the metal powder 200 is irradiated with microwaves. Examples of the pressurization method include uniaxial molding, cold isostatic pressing (CIP) molding, hot isostatic pressing (HIP) molding, roller pressurization, and the like. In the case of roller pressurization, the pressurization tip of the pressurizer 60 may be a roller type, and a pressurization technique that slides the stage 10 while the roller is pressurized on the stage 10 may be selected.

The metal powder 200 placed in the recess 103 of the layer 101 of the high-melting-point material on the stage 10 shown in FIG. 6 and irradiated with microwaves is then cooled, and sintered or melt-solidified to become a metal solid. The metal powder 200 in the vicinity of the edge part of the recess 103 of the layer 101 of the high-melting-point material tends to be easily heated. Therefore, in the vicinity of the edge part of the recess 103, the mass ratio of the absorbent material contained in the high-melting-point material may be lower than other parts.

The stage 10, microwave irradiator 20, etc. of the device for producing a metal solid according to the first embodiment may be stored in a housing.

The device for producing a metal solid according to the first embodiment may repeat forming the layer 101 of the high-melting-point material surrounding the metal powder on the sintered or melt-solidified metal solid and the layer 101 of the high-melting-point material surrounding the metal solid, and sintering or melt-solidifying the metal powder. As a result, even if the thickness of a metal solid formed by single microwave irradiation is thin, metal solids are laminated, and it is possible to produce thick metal solids. Every time the layer 101 of the high-melting-point material surrounding the metal powder is formed, the shape of the recess formed in the layer 101 of the high-melting-point material is changed, whereby it is possible to produce metal solids having a complex three-dimensional shape.

Figure 7:
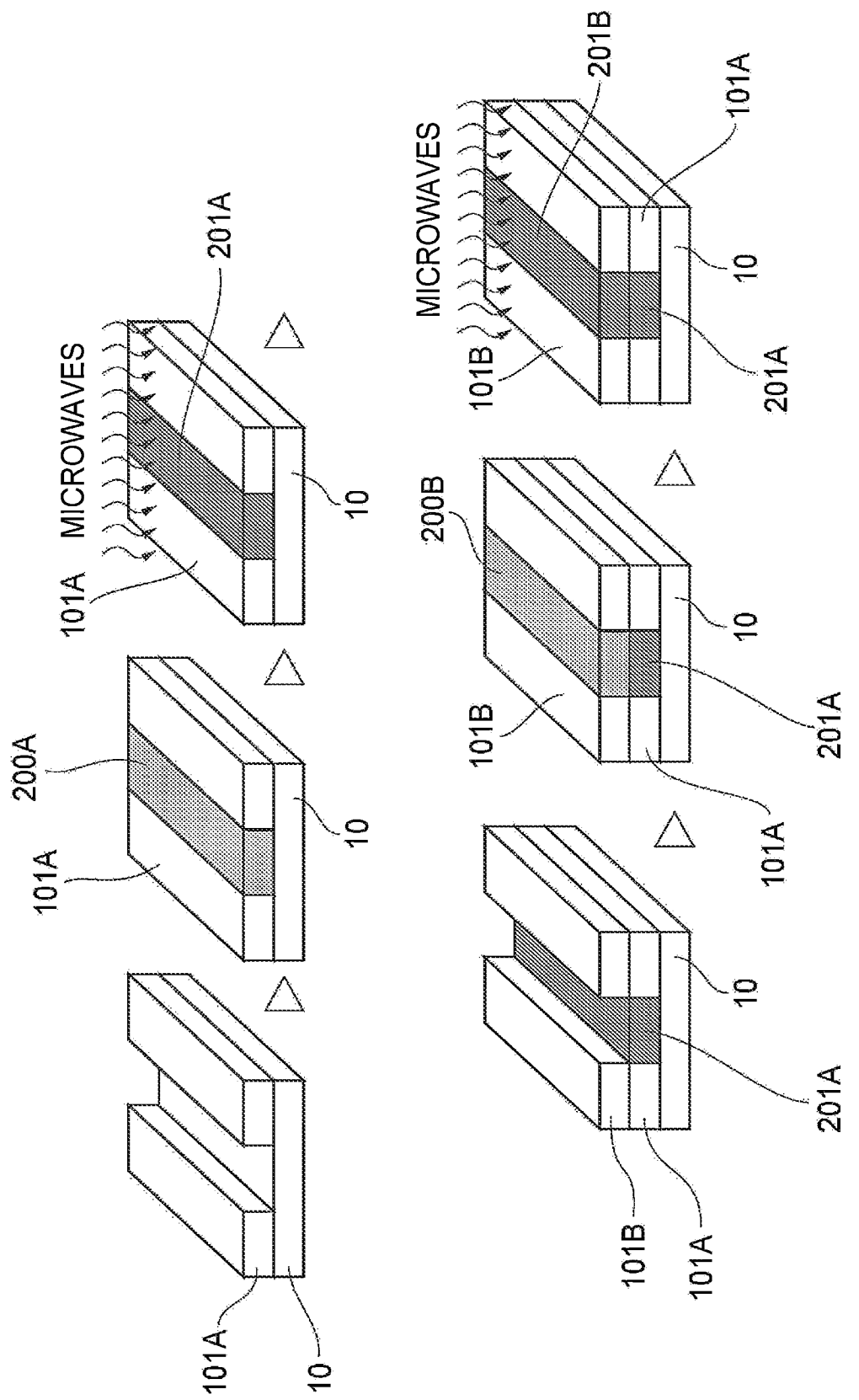
FIG. 7 is a schematic process diagram of a method for producing a metal solid according to the first embodiment.

That is, as shown in FIG. 7, a first layer 101A of the high-melting-point material is formed on the stage 10, and a metal powder 200A is placed in the recess of the layer 101A of the high-melting-point material. Next, the metal powder 200A is irradiated with microwaves to convert the metal powder 200A into a first layer of a metal solid 201A. Next, a second layer 101B of the high-melting-point material is formed on the first layer 101A of the high-melting-point material, and a metal powder 200B is placed in the recess of the layer 101B of the high-melting-point material. Here, the first layer of the metal solid 201A is exposed from the recess of the layer 101B of the high-melting-point material, and the metal powder 200B is in contact with the surface of the first layer of the metal solid 201A. Next, the metal powder 200B is irradiated with microwaves to convert the metal powder 200B into a second layer of a metal solid 201B. At this time, the second layer of the metal solid 201B sticks to the first layer of the metal solid 201A. Thereafter, the same process is repeated to laminate metal solids.

Second Embodiment

A method for producing a joined solid according to a second embodiment includes placing a metal powder on a solid; covering at least a portion of the periphery of the metal powder with a high-melting-point material having a melting point higher than the melting point of the metal powder; and irradiating the metal powder, at least a portion of the periphery of which is covered with the high-melting-point material, with microwaves to heat the metal powder, thereby sintering or melt-solidifying the metal powder to form a metal solid on the solid.

The material of the solid is not particularly limited, but is preferably a material having a melting point higher than that of the metal powder. Examples of the material of the solid include a metal having a melting point higher than that of the metal powder. The shape of the solid is not particularly limited. Examples of the shape of the solid include a flat plate, a cuboid, and a cylinder. For example, the solid may have a flat surface or a curved surface.

The metal powder and the high-melting-point material may be the same as those of the first embodiment. The method for placing the metal powder and the high-melting-point material may be the same as that of the first embodiment. The relative placement of the metal powder and the high-melting-point material may be the same as that of the first embodiment. The microwave irradiation conditions may be the same as those of the first embodiment.

The method for placing the metal powder on the solid is not particularly limited. The metal powder may be placed on the solid by using a recoater. The metal powder may be placed on at least some of the multiple surfaces of the solid. The metal powder may be placed so as to cover the entire solid. The thickness of the layer of the metal powder placed on the solid is appropriately set depending on the thickness of the metal solid to be formed. The thickness of the layer of the metal powder placed on the solid is constant, for example. A recess may be provided in the layer of the high-melting-point material placed on the stage, the solid may be placed in the recess of the layer of the high-melting-point material, and the metal powder may be placed on the solid. Alternatively, after the metal powder is placed on the solid, the high-melting-point material may be placed at least around the metal powder.

A pressure may be applied to the metal powder on the solid before microwaves are applied. The pressurization method may be the same as that of the first embodiment. A pressure may be applied to the metal powder after the metal powder is irradiated with microwaves.

The metal powder on the solid is sintered or melt-solidified to thereby form a metal solid on the solid. As a result, the metal solid is bonded to the solid. The metal solid to be formed may be membrane-like. For the purpose of coating the solid, a metal solid may be formed on the solid.

Further the forming a metal solid on the metal solid formed on the solid may be repeated. The metal solid may be membrane-like, and a multilayer membrane may be formed on the solid.

The method for producing a joined solid according to the second embodiment may be performed by the device for producing a metal solid described in the first embodiment.

Third Embodiment

A method for producing a joined solid according to a third embodiment includes placing a metal for bonding between a first solid and a second solid; covering at least a portion of the periphery of the metal for bonding with a high-melting-point material having a melting point higher than the melting point of the metal for bonding; and irradiating the metal for bonding, at least a portion of the periphery of which is covered with the high-melting-point material, with microwaves to heat the metal for bonding, thereby sintering or melt-solidifying the metal for bonding to bond the first solid and the second solid.

The materials of the first and second solids are not particularly limited, but are preferably materials having a melting point higher than that of the metal powder. Examples of the materials of the first and second solids include metals having a melting point higher than that of the metal powder. The shape of each of the first and second solids is not particularly limited. The first and second solids may have surfaces that can touch each other. The first solid may have a shape that can be engaged with the second solid. The first solid may have a shape that can be inserted into the second solid.

The metal for bonding may be a powder, a solid, or a liquid. When the metal for bonding is a solid, the metal for bonding may have a shape that can be inserted between the bonding surface of the first solid and the bonding surface of the second solid. When the metal for bonding is a liquid, the liquid may be viscous. The metal for bonding as a powder or a solid may be heated to form a liquid.

The material of the metal for bonding may be the same as the metal powder described in the first embodiment. The high-melting-point material may be the same as that of the first embodiment. The metal for bonding is placed between the bonding surface of the first solid and the bonding surface of the second solid, and the high-melting-point material is placed at least around the metal for bonding. The method for placing the high-melting-point material may be the same as that of the first embodiment. The relative placement of the metal for bonding and the high-melting-point material may be the same as the relative placement of the metal powder and the high-melting-point material in the first embodiment. The first solid or the second solid may be placed between the metal for bonding and the high-melting-point material. The microwave irradiation conditions may be the same as those of the first embodiment.

The method for placing the metal for bonding between the first and second solids is not particularly limited. When the metal for bonding is a powder or a liquid, the metal for bonding may be injected between the bonding surface of the first solid and the bonding surface of the second solid. When the metal for bonding is a solid, the metal for bonding may be inserted between the bonding surface of the first solid and the bonding surface of the second solid. Alternatively, even when the metal for bonding is a powder, a liquid, or a solid, after the metal for bonding is placed on the bonding surface of the first solid, the bonding surface of the second solid may be brought into contact with the metal for bonding.

A recess may be provided in a layer of the high-melting-point material placed on the stage, the first solid may be placed in the recess of the layer of the high-melting-point material, and the metal for bonding and the second solid may be placed in sequence on the first solid. Alternatively, after the metal for bonding is placed between the first solid and the second solid, the high-melting-point material may be placed at least around the metal for bonding.

Before microwaves are applied, a pressure may be applied to the metal for bonding placed between the first and second solids. For example, a pressure may be applied to at least one of the first and second solids, and a pressure may be applied to the metal for bonding. A pressure may be applied to the metal for bonding after the metal for bonding is irradiated with microwaves.

The metal for bonding between the first and second solids is sintered or melt-solidified to thereby bond the first solid and the second solid.

The method for producing a joined solid according to the third embodiment may be performed by the device for producing a metal solid described in the first embodiment.

Figure 8:
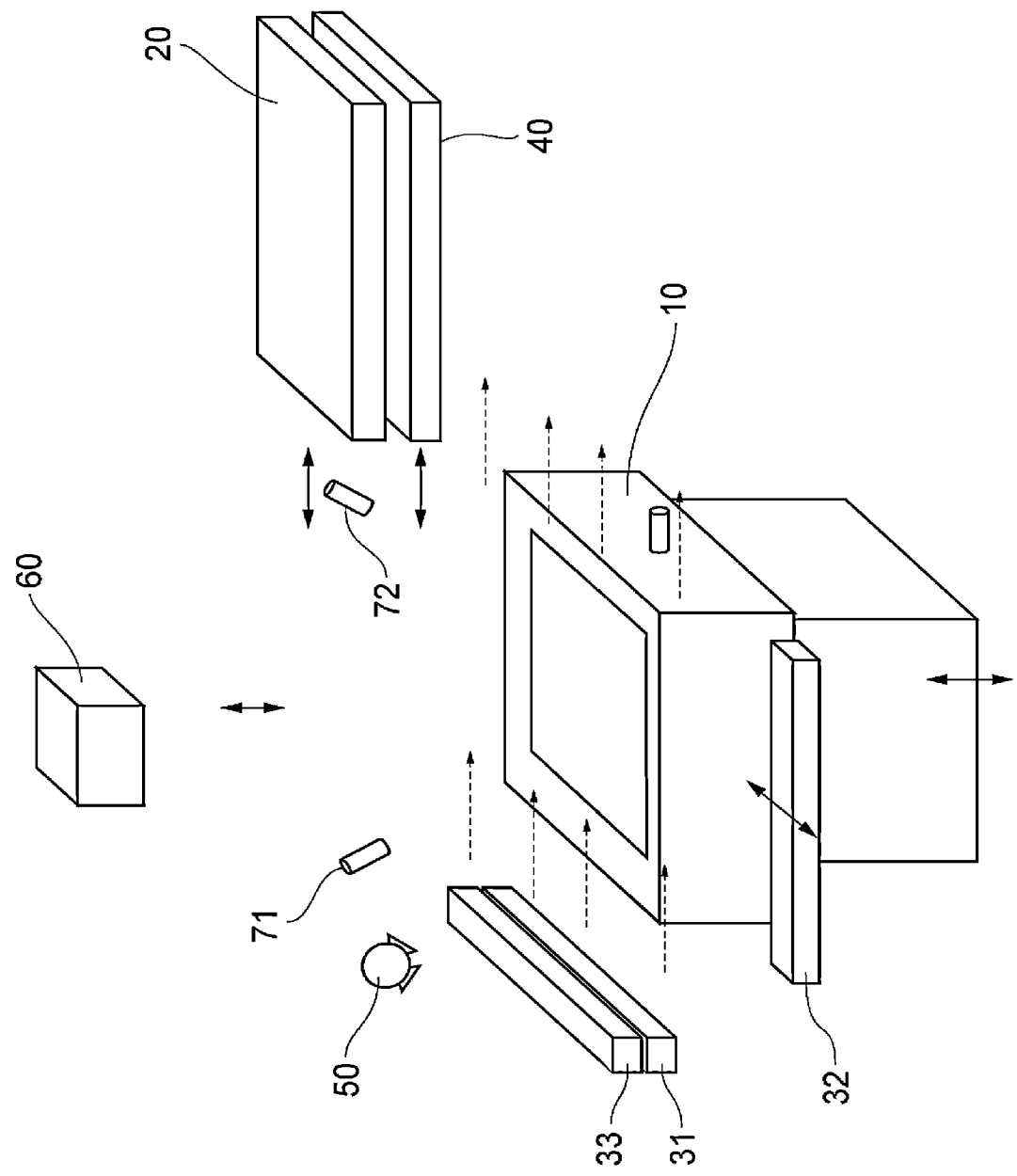
FIG. 8 is a schematic perspective view of a device for producing a metal solid according to the first embodiment.
Figure 9:
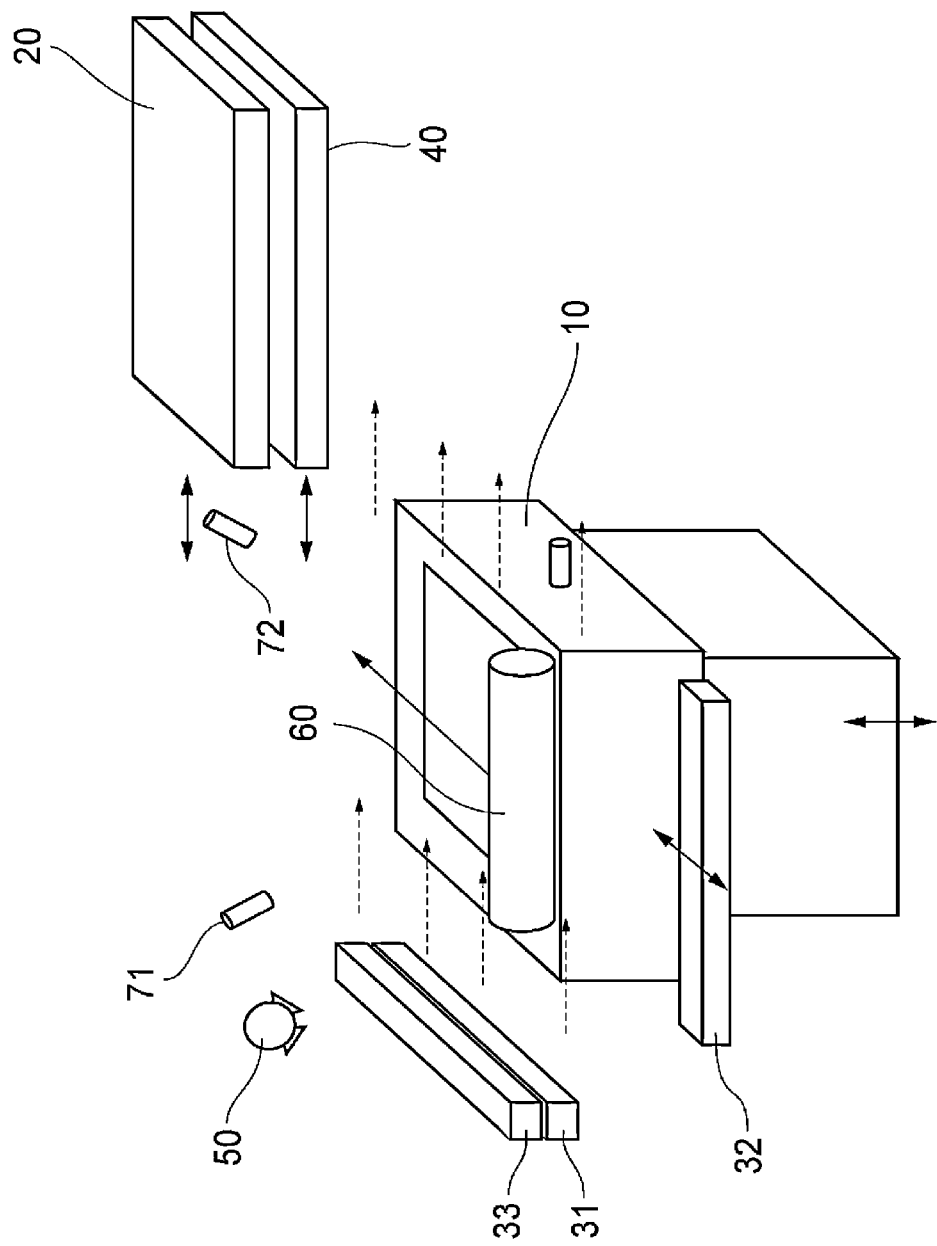
FIG. 9 is a schematic perspective view of a device for producing a metal solid according to the first embodiment.
Figure 10:
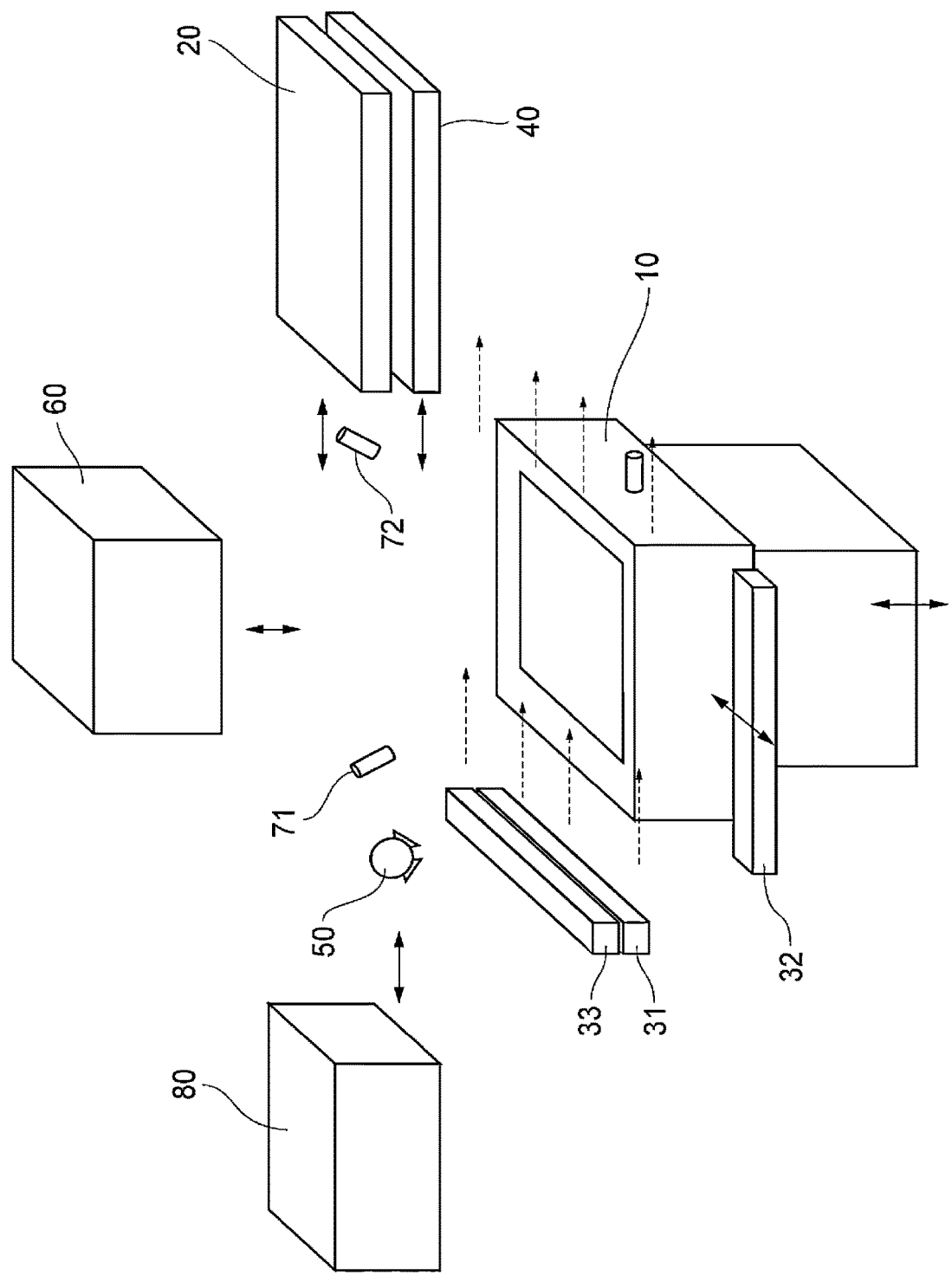
FIG. 10 is a schematic perspective view of a device for producing a metal solid according to the first embodiment.

The present disclosure has been described based on the embodiments as described above; however, the description and drawings forming part of this disclosure should not be understood as limiting the invention. Various alternative embodiments, examples, and operational techniques should become apparent to those skilled in the art from this disclosure. For example, the pressurizer 60 shown in FIG. 1 may pressurize the entire surface of the placed metal powder 200. Alternatively, as shown in FIG. 8, the pressurizer 60 having a contact area smaller than the surface area of the placed metal powder 200 may continuously pressurize the metal powder 200 while moving. Examples of the pressurization method include uniaxial molding, cold isostatic pressing (CIP) molding, hot isostatic pressing (HIP) molding, roller pressurization, and the like. In the case of roller pressurization, as shown in FIG. 9, the pressurizer 60 may include a roller, and a pressurization technique that moves the roller on the stage 10 or that slides the stage 10, while the roller is pressurized on the stage 10 may be selected. Further, for example, as shown in FIG. 10, the device for producing a metal solid according to the embodiment may include a reduction device 80 that reduces the metal powder before the metal powder is irradiated with microwaves. The reduction device 80 is, for example, a heating device, and heats the metal powder to reduce the metal powder. Thus, it should be understood that the present disclosure encompasses various embodiments and the like that are not described herein.

EXAMPLES

Example 1

A layer of a high-melting-point material was formed. The high-melting-point material was made of 93 mass % of aluminum oxide ($Al_2O_3$) powder and 7 mass % of carbon (C) powder. A portion of the surface of the layer of the high-melting-point material to be provided with a recess was covered with a circular aluminum plate, and a curable material was sprayed to the surface of the layer of the high-melting-point material so that a portion of the layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the layer of the high-melting-point material was irradiated with UV light to cure the curable resin impregnated into the layer of the high-melting-point material. The uncured high-melting-point material covered with the aluminum plate was removed with air shower. As a result, a cylindrical recess was formed in the layer of the high-melting-point material. The bottom diameter of the cylindrical recess was 7.0 mm, and the depth was 4.0 mm.

The recess provided in the layer of the high-melting-point material was filled with a metal powder (average particle size: 45 μm). The metal powder was made of 100% of iron (Fe). A press machine was used to apply a pressure of 250 MPa to the metal powder and the high-melting-point material surrounding the metal powder. The high-melting-point material and the metal powder were irradiated with 700 W of microwaves for 180 seconds under air atmosphere, and the metal powder was heated to 1350° C. (estimate). FIG. 11 shows photographs of a metal solid obtained by sintering the metal powder. The obtained metal solid was cylindrical, the bottom diameter was 7.0 mm, and the height was 4.0 mm. The density of the obtained metal solid was 4.5 g/cm$^2$, and the relative density (=density/true density) was 58%.

Example 2

A first layer of a high-melting-point material was formed. The high-melting-point material was made of 93 mass % of aluminum oxide ($Al_2O_3$) powder and 7 mass % of carbon (C) powder. A portion of the surface of the first layer of the high-melting-point material to be provided with a recess was covered with a circular aluminum plate, and a curable material was sprayed to the surface of the first layer of the high-melting-point material so that a portion of the first layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the first layer of the high-melting-point material was irradiated with UV light to cure the curable resin impregnated into the first layer of the high-melting-point material. The uncured high-melting-point material covered with the aluminum plate was removed with air shower. As a result, a cylindrical recess was formed in the first layer of the high-melting-point material. The bottom diameter of the cylindrical recess was 7.0 mm, and the depth was 4.2 mm.

The recess provided in the first layer of the high-melting-point material was filled with a metal powder. The metal powder was made of 100% of iron (Fe). A press machine was used to apply a pressure of 250 MPa to the metal powder and the high-melting-point material surrounding the metal powder. The high-melting-point material and the metal powder were irradiated with 700 W of microwaves for 180 seconds under air atmosphere to heat the metal powder to 1350° C. (estimate), thereby obtaining a cylindrical metal solid.

A second layer of a high-melting-point material was formed on the first layer of the high-melting-point material. The high-melting-point material was made of 93 mass % of aluminum oxide ($Al_2O_3$) and 7 mass % of carbon (C). A portion of the surface of the second layer of the high-melting-point material to be provided with a recess, right above the metal solid surrounded by the first layer of the high-melting-point material was covered with a circular aluminum plate, and a curable material was sprayed to the surface of the second layer of the high-melting-point material so that a portion of the second layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the second layer of the high-melting-point material was irradiated with UV light to cure the curable resin impregnated into the second layer of the high-melting-point material. The uncured high-melting-point material covered with the aluminum plate was removed with air shower. As a result, a cylindrical recess was formed in the second layer of the high-melting-point material. The bottom diameter of the cylindrical recess was 7.0 mm, and the depth was 2.4 mm. The upper surface of the metal solid surrounded by the first layer of the high-melting-point material was exposed from the recess provided in the second layer of the high-melting-point material.

The recess provided in the second layer of the high-melting-point material was filled with a metal powder. The metal powder was made of 100% of iron (Fe). A press machine was used to apply a pressure of 250 MPa to the metal powder and the high-melting-point material surrounding the metal powder. The high-melting-point material and the metal powder were irradiated with 700 W of microwaves for 180 seconds under air atmosphere to heat the metal powder to 1350° C. (estimate), thereby obtaining a cylindrical metal solid. In this case, the metal solid surrounded by the first layer of the high-melting-point material and the metal solid surrounded by the second layer of the high-melting-point material were combined together.

Figure 12:
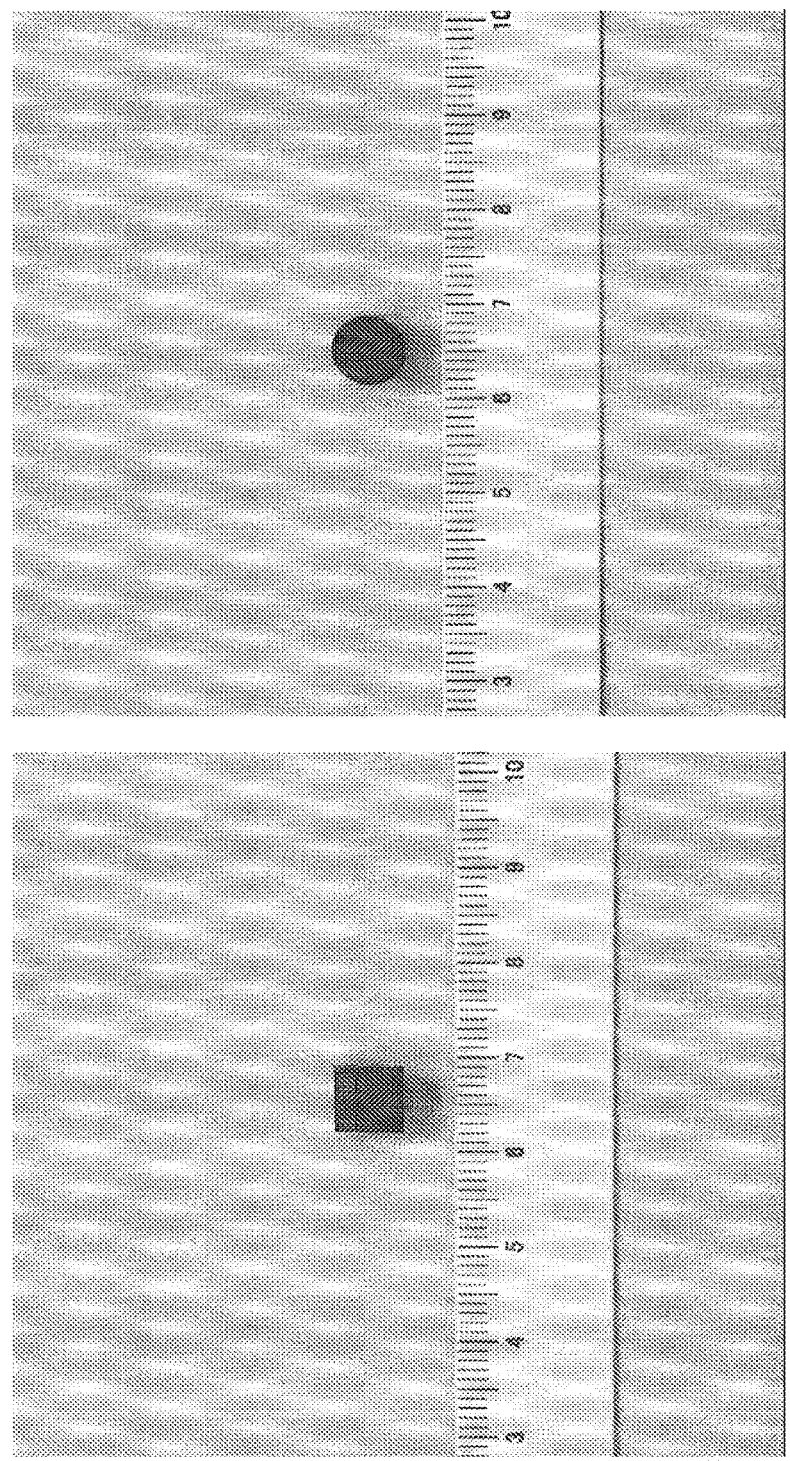
FIG. 12 shows photographs of a metal solid obtained in Example 2.

FIG. 12 shows photographs of a metal solid obtained by sintering the metal powder. The obtained metal solid was cylindrical, the bottom diameter was 7.0 mm, and the height was 6.6 mm. The density of the obtained metal solid was 4.1 g/cm$^2$, and the relative density was 52%.

Example 3

A layer of a high-melting-point material was formed. The high-melting-point material was made of 93 mass % of aluminum oxide ($Al_2O_3$) powder and 7 mass % of carbon (C) powder. A portion of the surface of the layer of the high-melting-point material to be provided with a recess was covered with a triangular aluminum plate, and a curable material was sprayed to the surface of the layer of the high-melting-point material so that a portion of the layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the layer of the high-melting-point material was irradiated with UV light to cure the curable resin impregnated into the layer of the high-melting-point material. The uncured high-melting-point material covered with the aluminum plate was removed with air shower. As a result, a triangular prismatic recess was formed in the layer of the high-melting-point material. The length of the base of the bottom of the triangular prismatic recess was 8.0 mm, and the depth was 1.4 mm.

Figure 13:
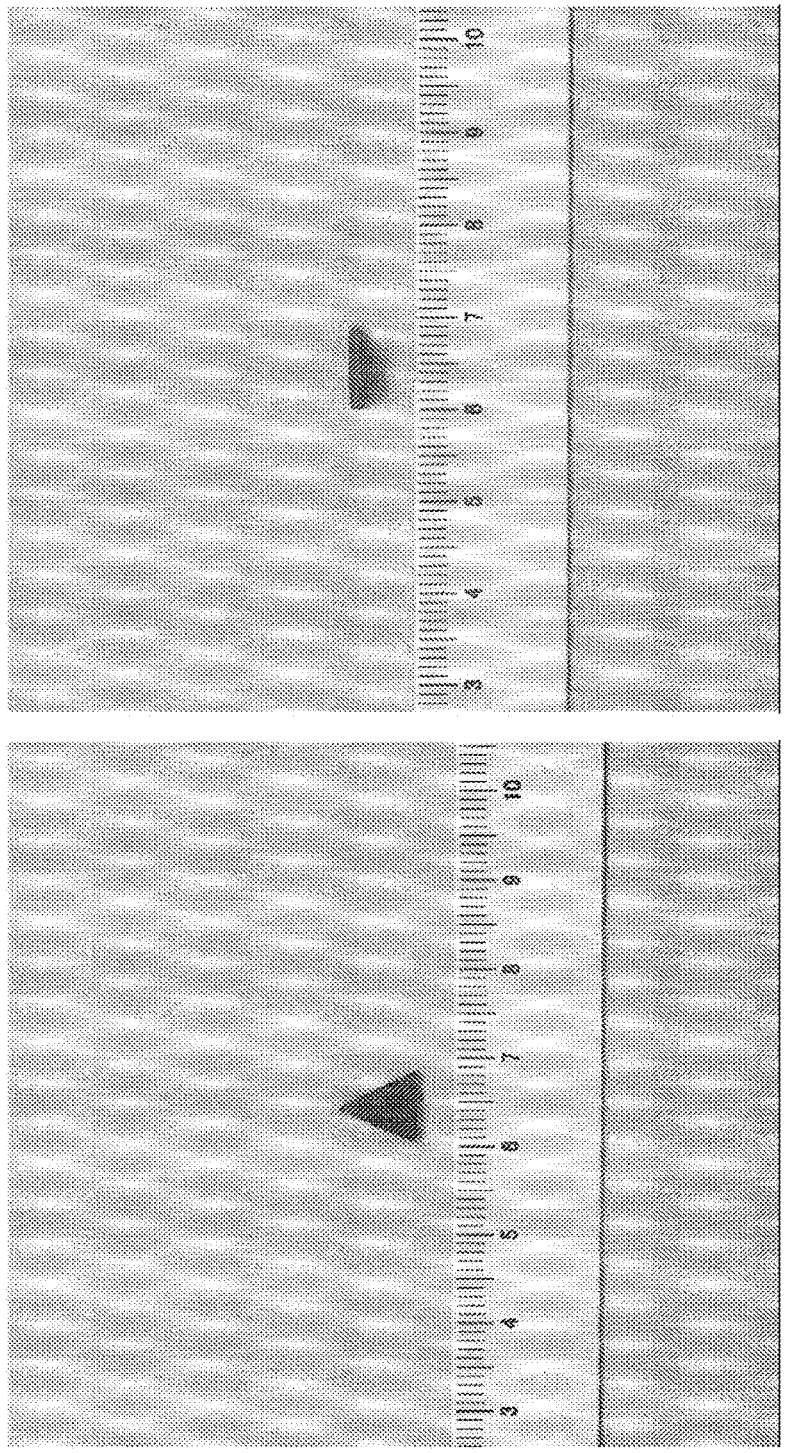
FIG. 13 shows photographs of a metal solid obtained in Example 3.

The recess provided in the layer of the high-melting-point material was filled with a metal powder. The metal powder was made of 100% of iron (Fe). A press machine was used to apply a pressure of 250 MPa to the metal powder and the high-melting-point material surrounding the metal powder. The high-melting-point material and the metal powder were irradiated with 500 W of microwaves for 70 seconds under air atmosphere to heat the metal powder to 1250° C. (estimate). FIG. 13 shows photographs of a metal solid obtained by sintering the metal powder. The obtained metal solid was triangular prismatic, the length of the base of the bottom was 8.0 mm, and the height was 1.4 mm. The density of the obtained metal solid was 4.5 g/cm$^2$, and the relative density was 58%.

Example 4

A layer of a high-melting-point material was formed. The high-melting-point material was made of 93 mass % of aluminum oxide (Al$_2$O$_3$) powder and 7 mass % of carbon (C) powder. A portion of the surface of the layer of the high-melting-point material to be provided with a recess was covered with a square aluminum plate, and a curable material was sprayed to the surface of the layer of the high-melting-point material so that a portion of the layer of the high-melting-point material not covered with the aluminum plate was impregnated with the curable material. The curable material contained 50 mass % of UV-curable resin (Standard Photopolymer Resin, produced by AMZLAB GmbH) and 50 mass % of ethanol. Thereafter, the layer of the high-melting-point material was irradiated with UV light to cure the curable resin impregnated into the layer of the high-melting-point material. The uncured high-melting-point material covered with the aluminum plate was removed with air shower. As a result, a quadrangular prismatic recess was formed in the layer of the high-melting-point material. The length of the base of the bottom of the quadrangular prismatic recess was 7.2 mm, and the depth was 1.9 mm.

Figure 14:
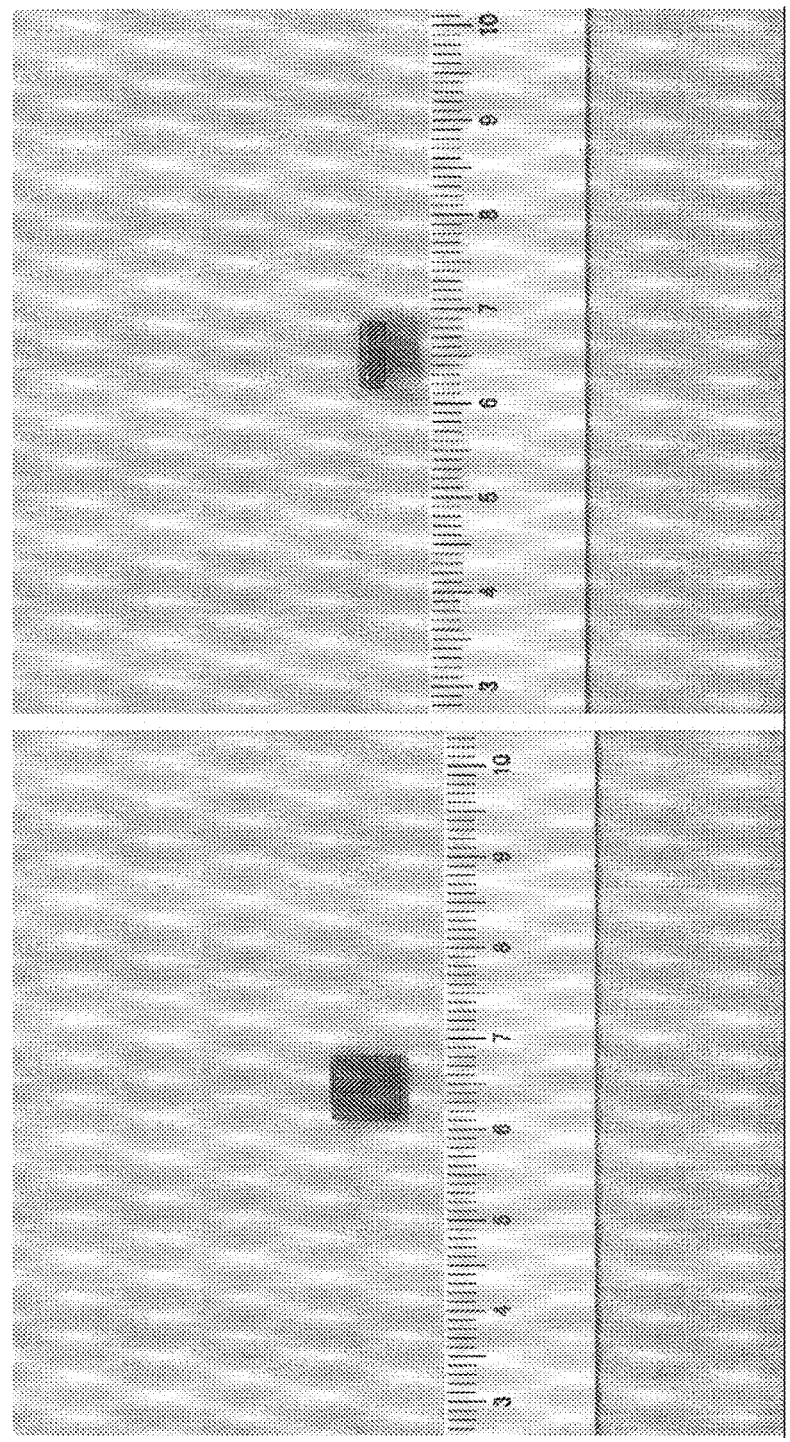
FIG. 14 shows photographs of a metal solid obtained in Example 4.

The recess provided in the layer of the high-melting-point material was filled with a metal powder. The metal powder was made of 100% of iron (Fe). A press machine was used to apply a pressure of 250 MPa to the metal powder and the high-melting-point material surrounding the metal powder. The high-melting-point material and the metal powder were irradiated with 500 W of microwaves for 70 seconds under air atmosphere to heat the metal powder to 1250° C. (estimate). FIG. 14 shows photographs of a metal solid obtained by sintering the metal powder. The obtained metal solid was quadrangular prismatic, the length of the base of the bottom was 7.2 mm, and the height was 1.9 mm. The density of the obtained metal solid was 4.5 g/cm$^2$, and the relative density was 58%.

Example 5

A cylindrical solid made of 99.8% of copper (Cu) was prepared. The diameter of the solid was 7 mm, and the height was 10 mm. A green compact produced by applying a pressure of 250 Mpa to 99.8% of copper (Cu) powder was placed on the solid. The shape of the green compact was cylindrical, the diameter was 10 mm, and the height was 2 mm. The green compact was placed so that the center of the solid matched the center of the green compact.

A layer of a high-melting-point material was formed around the solid and the green compact. The high-melting-point material was made of 93 mass % of aluminum oxide (Al$_2$O$_3$) powder and 7 mass % of carbon (c) powder. A curable material was sprayed to the surface of the layer of the high-melting-point material so that the high-melting-point material was impregnated with the curable material. The curable material contained 50 mass % of UV-curable resin (Standard Photopolymer Resin, produced by AMZLAB GmbH) and 50 mass % of ethanol. Thereafter, the layer of the high-melting-point material was irradiated with UV light to cure the curable resin impregnated into the layer of the high-melting-point material.

Figure 15:
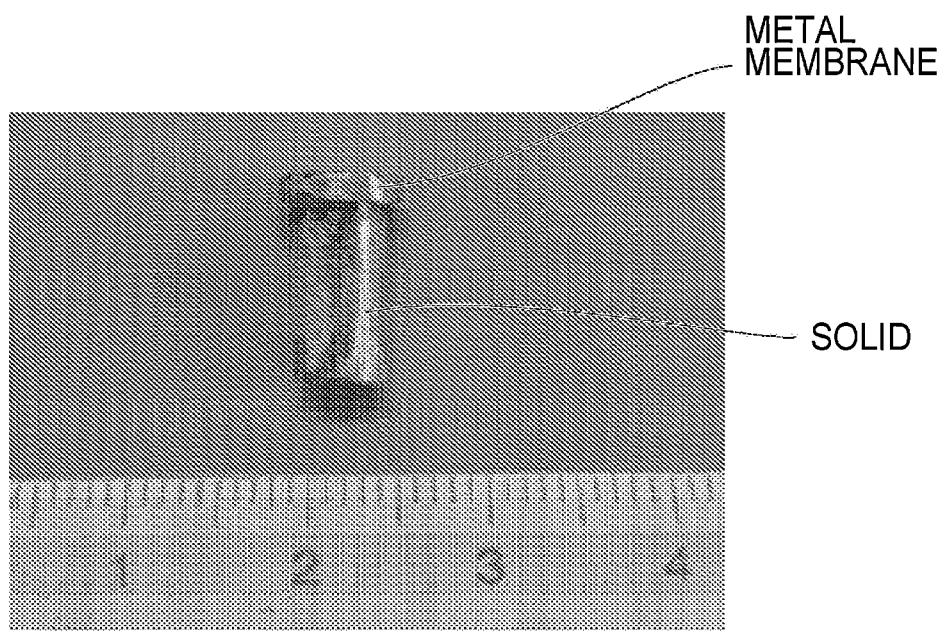
FIG. 15 shows a photograph of a solid covered with a metal membrane obtained in Example 5.

While a pressure of 20 MPa was applied to the solid and the green compact, the green compact covered with the high-melting-point material was irradiated with 700 W of microwaves for 85 seconds to heat the green compact to 800° C. (estimate). FIG. 15 shows a photograph of a solid covered with a copper metal membrane (metal solid) as a result of sintering of the green compact. The solid and the metal membrane were strongly bonded together.

Example 6

A cylindrical solid made of a tool steel material (SKD61) was prepared. The diameter of the solid was 10 mm, and the height was 4 mm. A green compact produced by applying a pressure of 1750 MPa to a powder of a tool steel material (SKD61) was placed on the solid. The shape of the green compact was cylindrical, the diameter was 10 mm, and the height was 4 mm. The green compact was placed so that the center of the solid matched the center of the green compact.

A layer of a high-melting-point material was formed around the solid and the green compact in the same manner as in Example 5.

Figure 16:
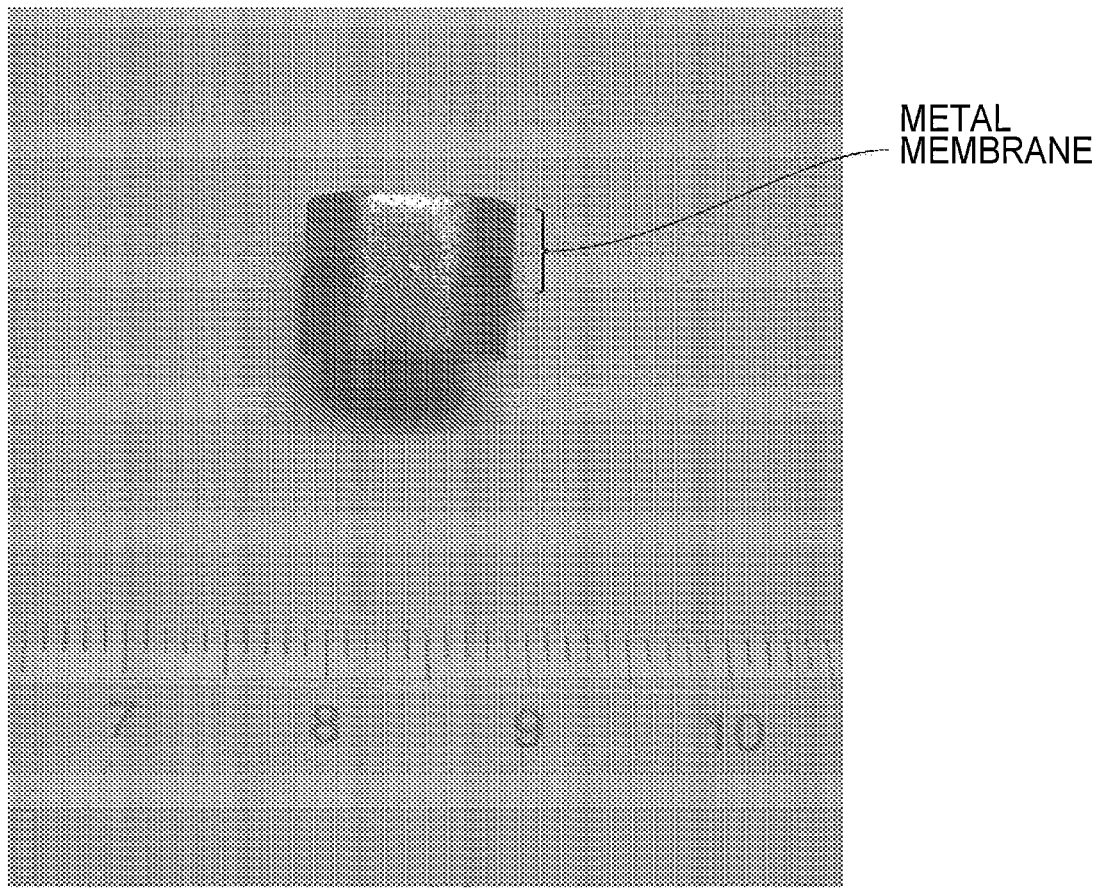
FIG. 16 shows a photograph of a solid covered with a metal membrane obtained in Example 6.

While a pressure of 20 MPa was applied to the solid and the green compact, the green compact covered with the high-melting-point material was irradiated with 400 W of microwaves for 1500 seconds to heat the green compact to 1200° C. (estimate). FIG. 16 shows a photograph of a solid covered with a tool steel material metal membrane (metal solid) as a result of sintering of the green compact. The solid and the metal membrane were strongly bonded together.

Example 7

A cylindrical solid made of a carbon steel material (S45C) was prepared. The diameter of the solid was 10 mm, and the height was 10 mm. A green compact produced by applying a pressure of 250 MPa to a powder of an aluminum alloy (A6061) was placed on the solid. The shape of the green compact was cylindrical, the diameter was 10 mm, and the height was 4 mm. The green compact was placed so that the center of the solid matched the center of the green compact.

A layer of a high-melting-point material was formed around the solid and the green compact in the same manner as in Example 5.

Figure 17:
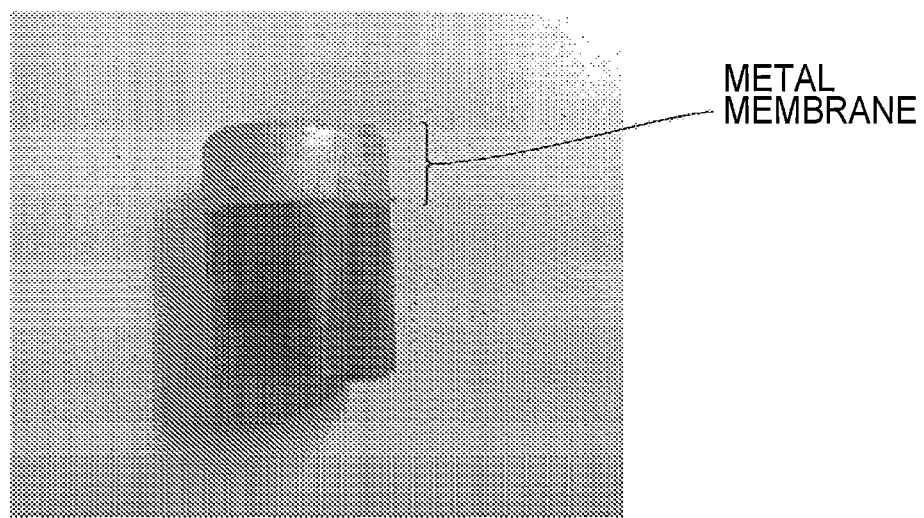
FIG. 17 shows a photograph of a solid covered with a metal membrane obtained in Example 7.

While a pressure of 20 MPa was applied to the solid and the green compact, the green compact covered with the high-melting-point material was irradiated with 200 W of microwaves for 1500 seconds to heat the green compact to 400° C. (estimate). FIG. 17 shows a photograph of a solid covered with an aluminum alloy metal membrane (metal solid) as a result of sintering of the green compact. The solid and the metal membrane were strongly bonded together.

Example 8

A cylindrical first solid made of 99.8% of copper (Cu) was prepared. The diameter of the first solid was 10 mm, and the height was 10 mm. A green compact produced by applying a pressure of 250 MPa to 99.8% of copper (Cu) powder was placed as a metal for bonding on the first solid. The shape of the green compact was cylindrical, the diameter was 10 mm, and the height was 3 mm. The green compact was placed so that the center of the first solid matched the center of the green compact. A cylindrical second solid made of 99.8% of copper (Cu) was placed on the green compact. The diameter of the second solid was 10 mm, and the height was 6 mm. The second solid was placed so that the center of the green compact matched the center of the second solid.

A layer of a high-melting-point material was formed around the first solid, the green compact, and the second solid in the same manner as in Example 5.

Figure 18:
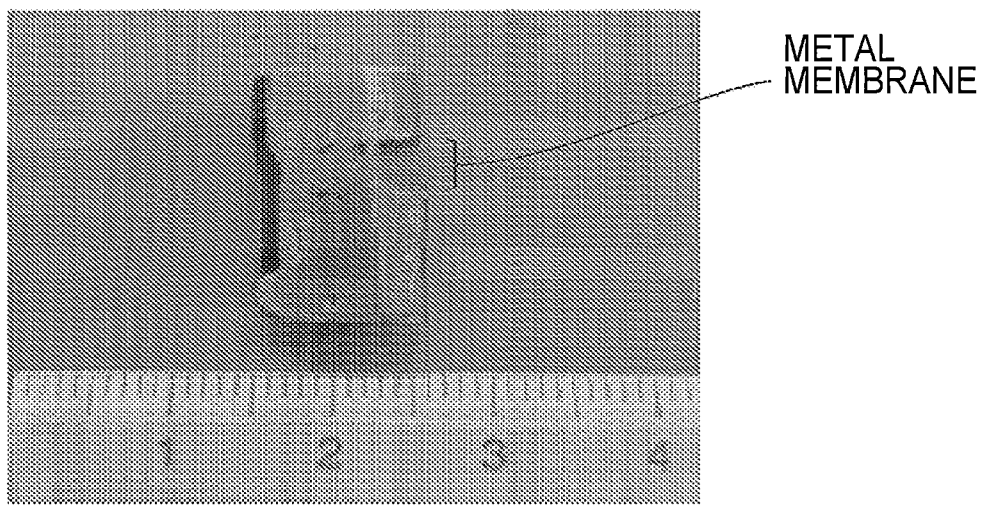
FIG. 18 shows a photograph of a joined solid obtained in Example 8.

The green compact covered with the high-melting-point material was irradiated with 700 W of microwaves for 135 seconds to heat the green compact to 800° C. (estimate). FIG. 18 shows a photograph of a joined solid in which the first solid and the second solid were bonded together as a result of sintering of the green compact. The first solid and the second solid were strongly bonded together.

Example 9

A cylindrical first solid made of a tool steel material (SKD61) was prepared. The diameter of the first solid was 10 mm, and the height was 10 mm. A green compact produced by applying a pressure of 1750 MPa to a powder of a tool steel material (SKD61) was placed as a metal for bonding on the first solid. The shape of the green compact was cylindrical, the diameter was 10 mm, and the height was 3 mm. The green compact was placed so that the center of the first solid matched the center of the green compact. A cylindrical second solid made of a tool steel material (SKD61) was placed on the green compact. The diameter of the second solid was 10 mm, and the height was 6 mm. The second solid was placed so that the center of the green compact matched the center of the second solid.

A layer of a high-melting-point material was formed around the first solid, the green compact, and the second solid in the same manner as in Example 5.

Without applying a pressure, the green compact covered with the high-melting-point material was irradiated with 400 W of microwaves for 2000 seconds to heat the green compact to 1200° C. (estimate). The first solid and the second solid were strongly bonded together.

Example 10

A cylindrical first solid made of a tool steel material (SKD61) was prepared. The diameter of the first solid was 10 mm, and the height was 4 mm. A solid of a tool steel material (SKD61) was placed as a metal for bonding on the first solid. The shape of the metal for bonding was cylindrical, the diameter was 10 mm, and the height was 4 mm. The metal for bonding was placed so that the center of the first solid matched the center of the metal for bonding. A cylindrical second solid made of a tool steel material (SKD61) was placed on the metal for bonding. The diameter of the second solid was 10 mm, and the height was 4 mm. The second solid was placed so that the center of the metal for bonding matched the center of the second solid.

A layer of a high-melting-point material was formed around the first solid, the metal for bonding, and the second solid in the same manner as in Example 5.

Figure 19:
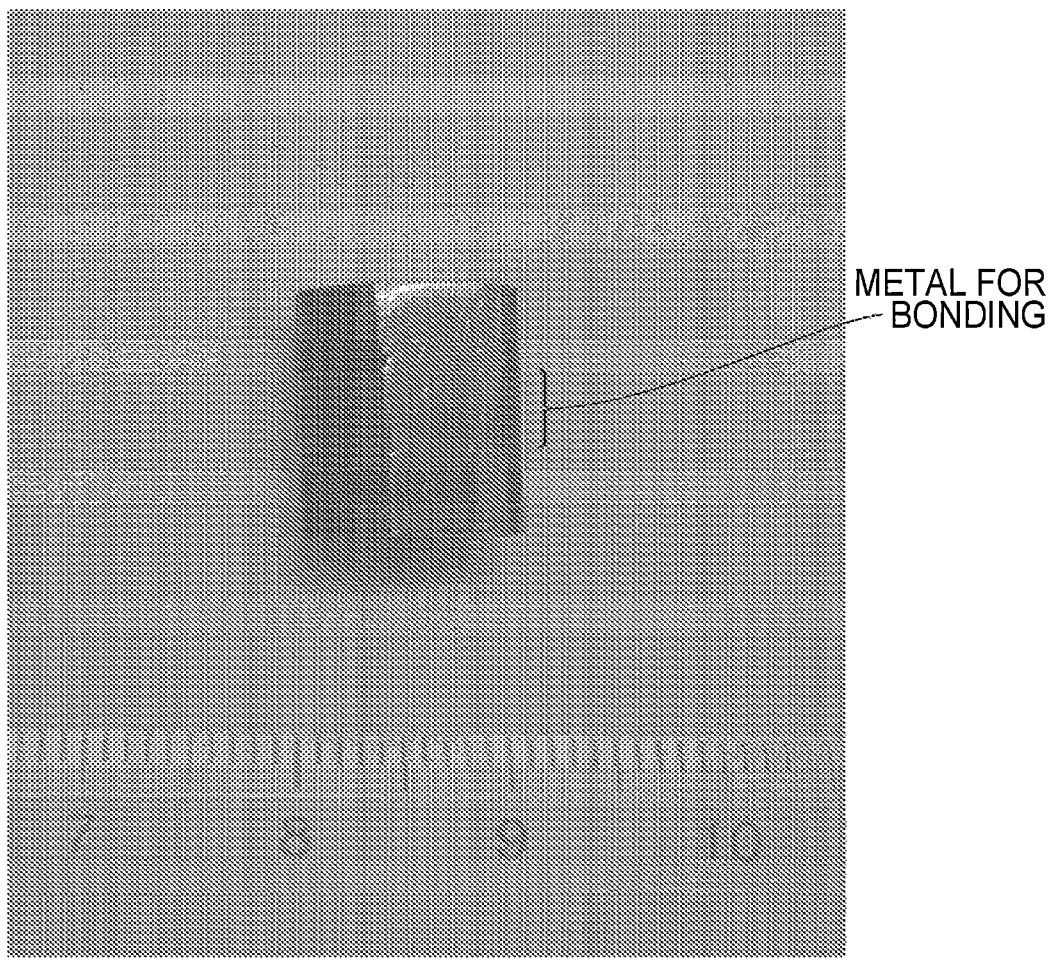
FIG. 19 shows a photograph of a joined solid obtained in Example 10.

While a pressure of 20 MPa was applied to the first solid, the metal for bonding, and the second solid, the metal for bonding covered with the high-melting-point material was irradiated with 400 W of microwaves for 2000 seconds to heat the metal for bonding to 1200° C. (estimate). FIG. 19 shows a photograph of a joined solid in which the first solid and the second solid were bonded together as a result of melt-solidification of the metal for bonding. The first solid and the second solid were strongly bonded together.

REFERENCE SIGNS LIST

10 . . . stage, 20 . . . microwave irradiator, 31 . . . high-melting-point material placement unit, 32 . . . curable material addition unit, 33 . . . metal powder placement unit, 40 . . . curing device, 50 . . . uncured material remover, 60 . . . pressurizer, 101 . . . layer, 102 . . . portion, 103 . . . recess, 200 . . . metal powder

The invention claimed is:

1. A method for producing a joined solid, the method comprising:
   placing a metal for bonding between a first solid and a second solid;
   covering at least a portion of the periphery of the metal for bonding with a high-melting-point material having a melting point higher than the melting point of the metal for bonding; and
   irradiating the metal for bonding, at least a portion of the periphery of which is covered with the high-melting-point material, with microwaves to heat the metal for bonding, thereby sintering or melt-solidifying the metal for bonding to bond the first solid and the second solid; and
   removing at least a portion of the high-melting point material from the metal for bonding,
   wherein in the portion of the metal for bonding covered with the high-melting-point material, the metal for bonding and the high-melting-point material are in close contact with each other, and
   the high-melting-point material includes a mixture of:
      an insulation material that has a lower degree of absorption of the microwaves than the metal for bonding, and
      an absorbent material that absorbs the microwaves in a temperature zone at least a portion of which is lower than a temperature zone in which the metal for bonding absorbs the microwaves.

2. The method for producing a joined solid according to claim 1, wherein the metal for bonding is a powder.

3. The method for producing a joined solid according to claim 1, wherein the high-melting-point material includes from 1 mass % to 70 mass % of the absorbent material.

4. The method for producing a joined solid according to claim 1, wherein the insulation material includes an oxide.

5. The method for producing a joined solid according to claim 1, wherein the absorbent material includes a carbon material.

6. The method for producing a joined solid according to claim 1, wherein the metal for bonding includes a metal compound.

7. The method for producing a joined solid according to claim 1, wherein the metal for bonding further includes an alloy component.

8. The method for producing a joined solid according to claim 1, further comprising applying a pressure to the metal for bonding before irradiating the metal for bonding with microwaves.

9. The method for producing a joined solid according to claim 1, the irradiating the metal for bonding with the microwaves is performed in an inert gas atmosphere.

10. The method for producing a joined solid according to claim 1, wherein the irradiating the metal for bonding with microwaves is performed in a reducing atmosphere.

11. The method for producing a joined solid according to claim 1, wherein the covering at least a portion of the periphery of the metal for bonding with the high-melting-point material having a melting point higher than the melting point of the metal for bonding includes:
- forming a layer of the high-melting-point material;
- forming a recess in the layer of the high-melting-point material; and
- placing the first and second solids and the metal for bonding in the recess.

12. The method for producing a joined solid according to claim 11, wherein the forming the recess in the layer of the high-melting-point material includes:
- curing a portion of the layer of the high-melting-point material; and
- removing an uncured portion of the layer of the high-melting-point material.

13. The method for producing a joined solid according to claim 12, wherein the curing the portion of the layer of the high-melting-point material includes incorporating a curable material into the portion of the layer of the high-melting-point material.

14. The method for producing a joined solid according to claim 13, wherein the portion of the layer of the high-melting-point material is impregnated with the curable material.

* * * * *